(12) United States Patent
Hadi Salim

(10) Patent No.: US 11,372,632 B2
(45) Date of Patent: Jun. 28, 2022

(54) SYSTEMS AND METHODS FOR CREATING AND DEPLOYING APPLICATIONS AND SERVICES

(71) Applicant: Mojatatu Networks, Ottawa (CA)

(72) Inventor: Jamal Hadi Salim, Ottawa (CA)

(73) Assignee: MOJATATU NETWORKS, Ottawa (CA)

( * ) Notice: Subject to any disclaimer, the term of this patent is extended or adjusted under 35 U.S.C. 154(b) by 0 days.

(21) Appl. No.: 17/099,691

(22) Filed: Nov. 16, 2020

(65) Prior Publication Data
US 2021/0149650 A1    May 20, 2021

Related U.S. Application Data

(60) Provisional application No. 62/935,355, filed on Nov. 14, 2019.

(51) Int. Cl.
*G06F 9/44* (2018.01)
*G06F 8/41* (2018.01)
*G06F 8/60* (2018.01)
*G06F 8/38* (2018.01)

(52) U.S. Cl.
CPC ............... *G06F 8/447* (2013.01); *G06F 8/38* (2013.01); *G06F 8/60* (2013.01)

(58) Field of Classification Search
CPC ............... G06F 9/447; G06F 9/38; G06F 9/60
USPC ......................................................... 717/107
See application file for complete search history.

(56) References Cited

U.S. PATENT DOCUMENTS

| | | | |
|---|---|---|---|
| 10,169,007 B1* | 1/2019 | Zakian | H04L 63/10 |
| 2006/0224533 A1* | 10/2006 | Thaler | G06N 3/105 |
| | | | 706/15 |
| 2009/0265243 A1* | 10/2009 | Karassner | G06Q 30/0275 |
| | | | 705/14.54 |
| 2016/0132309 A1* | 5/2016 | Rajasekhar | H04L 67/16 |
| | | | 717/102 |
| 2019/0213046 A1* | 7/2019 | Matus | H04L 41/12 |
| 2019/0229939 A1* | 7/2019 | Tuatini | H04L 51/36 |
| 2019/0349426 A1* | 11/2019 | Smith | H04W 4/08 |
| 2020/0313999 A1* | 10/2020 | Lee | H04L 43/0847 |
| 2020/0314219 A1* | 10/2020 | Watson | H04L 69/161 |
| 2021/0005185 A1* | 1/2021 | Ma | G10L 15/22 |
| 2021/0258284 A1* | 8/2021 | Pope | H04L 63/029 |

OTHER PUBLICATIONS

Title: OpenNetVM: A platform for high performance network service chains, author: W Zhang et al, published on 2016.*
Title: Region streams: Functional macroprogramming for sensor networks, author: R Newton, published on 2004.*
Title: Compiling business process models for sensor networks, author: A Caracaş, published on 2011.*

* cited by examiner

*Primary Examiner* — Chameli Das
(74) *Attorney, Agent, or Firm* — Jonathan Kidney; Intelink Law Group, P.C.

(57) ABSTRACT

A method for generating target codes for one or more network functions for execution in a network is provided. The method comprises: receiving, at a processor, a network function definition; receiving, at the processor, one or more templates comprising preprogrammed codes in a preset format; compiling, at the processor, the network function definition and the one or more templates by providing key terms from the network function definition to the one or more templates; and generating the target codes.

22 Claims, 21 Drawing Sheets

SYSTEMS AND METHODS FOR CREATING AND DEPLOYING APPLICATIONS AND SERVICES

CROSS-REFERENCE TO RELATED APPLICATIONS

The present application claims priority from U.S. provisional patent application No. 62/935,355, filed Nov. 14, 2019, entitled SYSTEMS AND METHODS FOR CREATING AND DEPLOYING APPLICATIONS AND SERVICES, which is incorporated in this application by reference.

FIELD

The present application relates to automated creation of pristine network infrastructure from a model intent, in particular to systems and methods for automated generation of network functions and services, their respective deployment and control and management.

BACKGROUND

The exponential growth of network data [Ref1] has called to question the traditional ways of deploying and operating infrastructure. There are not enough humans or time to operate infrastructure in the traditional approach. The status quo modus operandi is no longer sustainable from an economics (CAPEX and OPEX) point of view. To address these challenges an equivalent to the "industrial revolution" for compute and network infrastructure has been energized.

The desire to introduce new features in reasonable time frames, as well as reduce associated growth costs, has galvanized the dawn of an attempt for massive automation of network and associated compute infrastructure operations. A lot of effort has been invested in the last few years towards Application Lifecycle Management (ALM) orchestration, Software Defined Networking (SDN) and Network Function Virtualization (NFV).

Infrastructure orchestration in the form of ALM systems such as Openstack and Kubernetes have seen adoption as part of the resolution towards compute scaling. Such systems are focused in deploying applications and managing their life cycles.

SDN (the separation of control plane from the data plane) enables parallel development of the two planes by possibly two different organizations or suppliers. As a result, SDN accelerates the development of network services and reduces the involved costs by enabling competition from multiple infrastructure suppliers (from each plane).

The ETSI Network Function Virtualization (NFV) attempts disaggregation of hardware from software. Ideally, the NFV is to disaggregate supply of Network Function software away from the required hardware to execute the Network Function. Ideally multiple software vendors can supply competing solutions to the NFV consumer.

Although there are noticeable improvements to address the aforementioned scaling issues, there are still many outstanding challenges.

For example, substantial human interventions and higher crafts skills are required on the creation and operations in the new infrastructure approach. Infrastructure Application Lifecycle Management (ALM) orchestration systems like Openstack and Kubernetes have very high learning curves. Skills to write custom SDN applications and Network Functions are also hard and thus expensive to acquire and maintain, and substantial technical personnel skills in networking and compute operations are needed.

As well, each organization's network infrastructure is highly different as the needs of different organizations vary. As such, services and applications deployed across different organization network infrastructures vary in network functional requirements and services needs.

The status quo service creation approach is to put together network functions in a "square-peg-round-hole" approach, in which the service has to be created out by adjusting available vendor supplied network functions to fit the services of the clients.

It is desired to quickly deploy network services to meet evolving functional requirements or to address security issues.

However, the desire to be able to customize infrastructure and services based on business needs remains an important requirement across the board.

The current approach to resolve this challenge is to migrate infrastructure to managed cloud services who have under their employ high skill personnel; the extra cost in operations in the cloud is justified in exchange for the expertise provided by the cloud provider.

Cloud operators provide bundled infrastructure services and when possible up-sell on extra functions that organizations may desire to meet their needs when not covered by the basic cloud functions.

For extra Network Functions (required for specific organization's business needs) not offered by the public cloud operators, a current trend is to purchase these functions or services from either incumbent box vendors (in the form of NFV appliances) or the new emerging industry of ISVs (in the form of cloud infrastructure extensions).

To summarize, to substitute the legacy vendor supplied network pre-packaged-box-with-software, organizations are building dependencies on: cloud operators providing basic infrastructure functions; NFV appliance vendors, who are mostly the same legacy box vendors repackaging their box software in a VM or a container.

A brand of emerging ISVs who typically deploy XaaS operations on public cloud.

Incumbent network box vendors have opted, so far, to maintain their existing business models; they package their existing hardware appliance functions into VMs and require that customers buy an appliance-per-network-function —a continuation of the round-hole-square-peg quagmire. Additionally, every Network Function has a lock-in to the vendor's NFV appliances which is tied to the use of the vendor-proprietary interfaces for appliance-control. For example, migrating from a CISCO™ firewall Network Function to an equivalent one offered by Palo Alto™ requires acquisition of new operational knowledge which is costly.

While there is a good calculus on the deployment automation aspect with NFV, the current approach defeats an NFV main value proposition that one could use what they need for their business goals and when desired migrate to different vendors for a specific Network Function on a need-to basis.

On the other hand, the nouveau ISVs offer specific software solutions (example orchestration enhancements addressing new semantics or security software-as-a-service) and typically tiered license-based pricing models based on the number of deployed nodes. The ISVs also typically offer customized changes to their solutions for a fee.

This calls out for variations in ISV products and customizations to accommodate for the business logic. The implication to consumers includes extra capital costs for the customizations, extra recurring/operational fees for maintenance of the customizations, more importantly, time to value (i.e to get these features in place for consumption and stabilization) is often high.

There is a need to deliver new Services and functions quickly and at large infrastructure scale.

The ALM compute infrastructure world has moved to address this requirement with an approach of continuous development and deployment termed "devops"—which allows introduction and updates to compute infrastructure at high velocity. This is not the case with the networking world.

In the networking world reality is still defined by what was described earlier as the round-hole-square-peg quagmire. The network box vendor approach is to standardize products around "fixed" network functions and then building services from said functions.

SUMMARY

The systems and methods disclosed in the present application aim to reduce human intervention for creation of pristine new Network Functions(NFs) that are used in service creation, to reduce human intervention, and to improve acceleration for service creation using existing or newly created NFs.

In an embodiment, there is provided a method for generating target codes for one or more network functions for execution in a network, comprising: receiving, at a processor, a network function definition; receiving, at the processor, one or more templates comprising preprogrammed codes in a preset format; compiling, at the processor, the network function definition and the one or more templates by providing key terms from the network function definition to the one or more templates; and generating the target codes.

In another embodiment, there is provided a system for generating target codes for one or more network functions for execution in a network, comprising: one or more network definitions modules; one or more preprogrammed templates modules; and a processor configured to: receive a network function definition from the one or more network function definitions modules; receive, at the processor, one or more templates selected from the one or more preprogrammed templates modules, wherein the one or more templates comprises comprising preprogrammed codes in a preset format; and compile, at the processor, the network definition and the one or more templates by providing key terms from the network definition to the one or more templates; and generate the target codes.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In the present application, the term "a network function" (NF) or "network functions" (NFs) refer to a standalone module that encapsulates both a resource path, such as datapath, as well as control blocks. In an example, the NF may be in the form of an LFB or an extended ForCES LFB. In the present application, a NF is derived from extending the IETF ForCES data model for the Logical Functional Block(LFB) as will be described in greater detail below. NF in the present application is different from the classical NF definition of Network Function Virtualization (NFV). The NFV world has adopted a world of network appliances packaged into standalone virtual environments.

In the present application, the term "a Service" or "Services" refer to a collection of NFs acting in unison to process packets with a specified goal or intent. NFs are composed into a service as a graph with a specified processing flow. Relevant NFs of a Service can be deployed and integrated in the control infrastructure needed to achieve the desired service intent or goal.

The creation and injection (or implementation or deployment) of new NFs and Services is an orthogonal role to the underlying SDN policy management and control. In one embodiment, a service deployment is tasked to an ALM orchestration system such as kubernetes, openstack, etc., and the SDN system is in charge of management and control.

Figure 1:
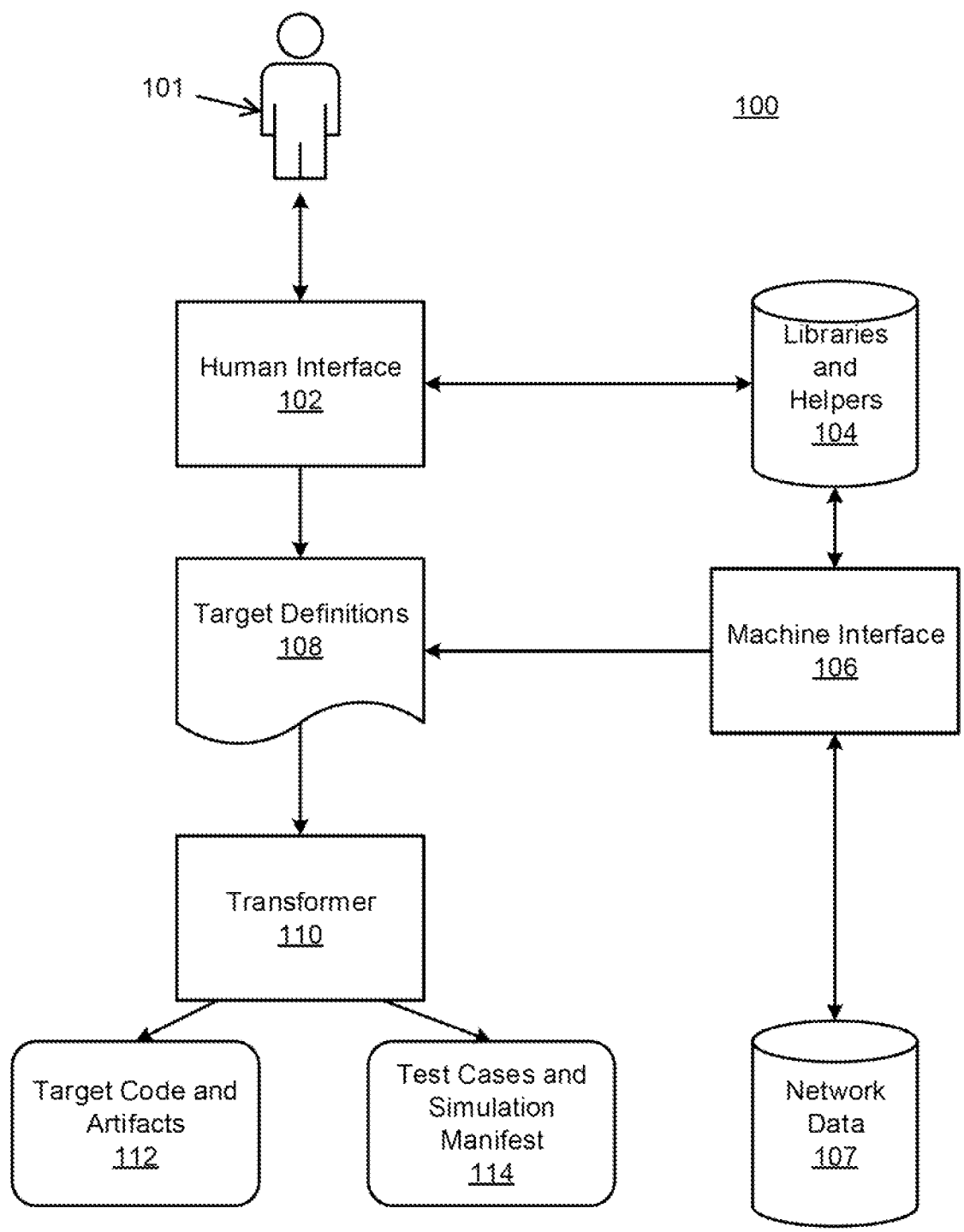
FIG. 1 is a block diagram of a creator system, according to an embodiment of the present application.

FIG. 1 illustrate an example of a creator system 100. As illustrated in FIG. 1, which shows an overview of the tooling for creation of NFs and services, a human interface 102 may specify the intent by a human operator 101 for a target. The human interface 102 takes input from a human operator 101 and uses existing tooling helpers and libraries 104, such as a library of existing NFs or a library of existing Service templates, to generate a definition for the intended target.

Alternative to the human interface 102 is a machine interface 106 which may use runtime policy, machine learning, and the like to prescribe the target definitions. The machine interface 106 may receive input from either real time or pre-collected network data 107, instead of from the human operator 101, and deduces the target intent. Similar to the approach taken by the human interface 102, the machine interface 106 may utilize target helpers and libraries 104 to generate the intent.

Target Definition 108 is specific to the appropriate target, such as a NF, a service, a LFB, etc. A transformer 110 may receive the Target Definition 108 as input and generate target codes and all necessary artifacts 112, and test cases and simulation manifests 114.

Figure 2A:
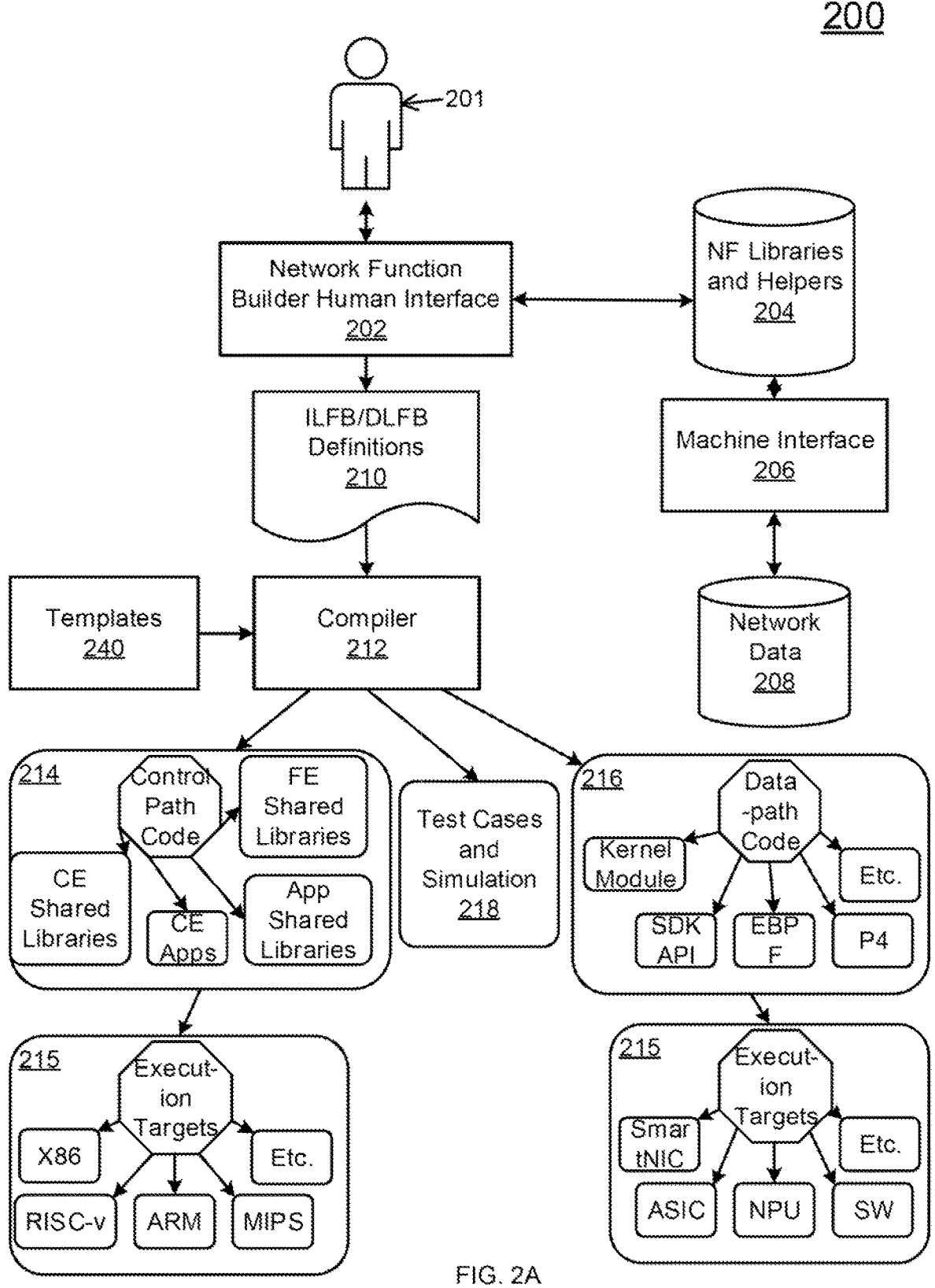
FIG. 2A is a block diagram of a creator Tooling when the target is a Network Function(NF)

FIG. 2A illustrates a system 200 for creation of NFs and/or services and generation of codes for the target, when the target is a Network Function(NF). As illustrated in FIG. 2A, a network function builder and human interface 202 may specify the NFs intent. The human interface 202 receives input from a human operator 201 and uses existing tooling helpers and libraries 204 to generate a definition for the intended one or more targets or NFs.

Alternative to the human interface 202 is an machine interface 206 which uses machine learning to prescribe the NF specification. The machine interface 206 may receive input from either real time or pre-collected network data 208, instead from the human operator 201, and deduce the target intent. Similar to the approach of the human interface 202, the machine interface 206 utilizes target helpers and libraries 204 to generate the intent.

ILFB/DLFB Definitions 210 are examples of NF definitions including LFB definitions, which describes the network function(s) of a module is supposed to achieve in its datapath as well as control path. NF definition describes the NF intent.

A compiler 212 receives ILFB/DLFB Definitions 210 as input and may generate: control path code 214 which may include shared libraries, CE applications, application shared libraries and FE shared libraries; datapath code 216 which includes Kernel Module, SDK API, eBPF, p4, FPGA, etc.; test cases and a manifest 218 which is used by a simulation environment to execute the validation testing. The compiler 212 may be implemented by a processor.

The execution targets 215 in FIG. 2A may compile the generated target codes to binaries or machine code and execute the binaries or machine code compiled from the control path codes or data path codes. For example, control code may be compiled to run in an ARM processor or intel x86 processor.

Figure 3:
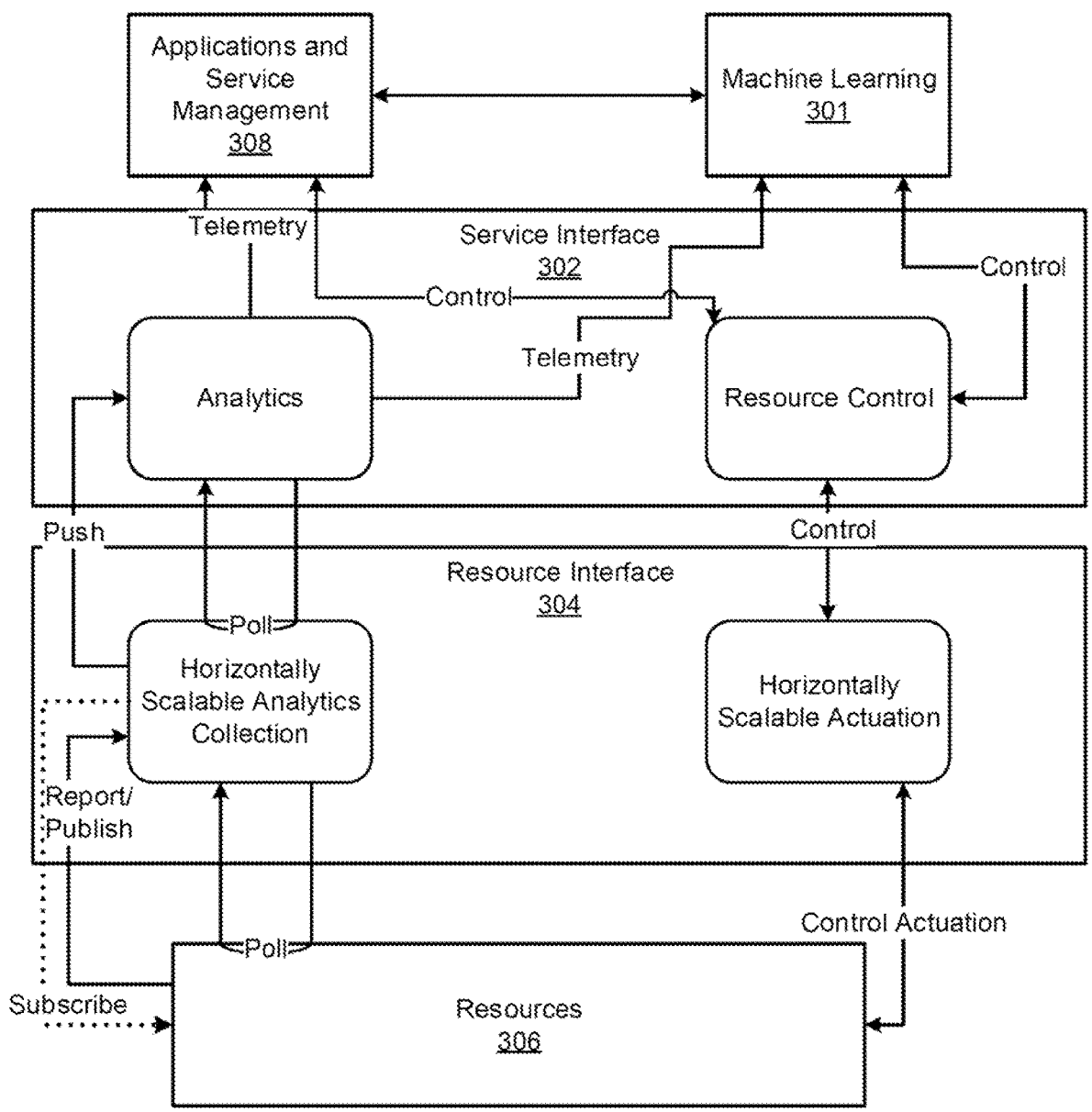
FIG. 3 is a block diagram illustrating a runtime service intent realization via a closed loop feedback control system, according to an embodiment.
Figure 10:
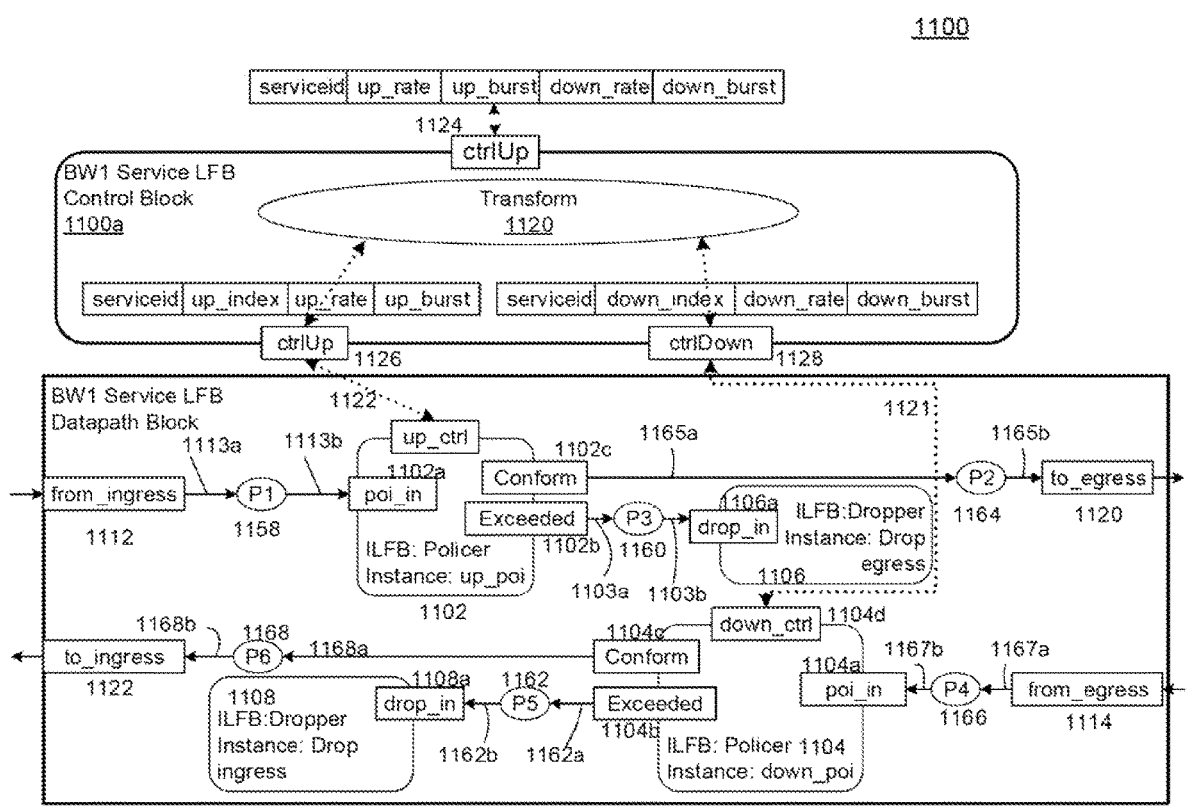
FIG. 10 is a block diagram illustrating a modeling of a service, according to an embodiment.

As described above, a Service comprises a plurality of NFs working in unison to achieve a defined service intent. For example, a service intent may be to provide upstream and downstream bandwidth management as illustrated in FIG. 10. A NF intent for a service intent may be encoded in the NF or service definition. FIG. 3 described below may implement the NF intent or service intent.

Figure 2B:
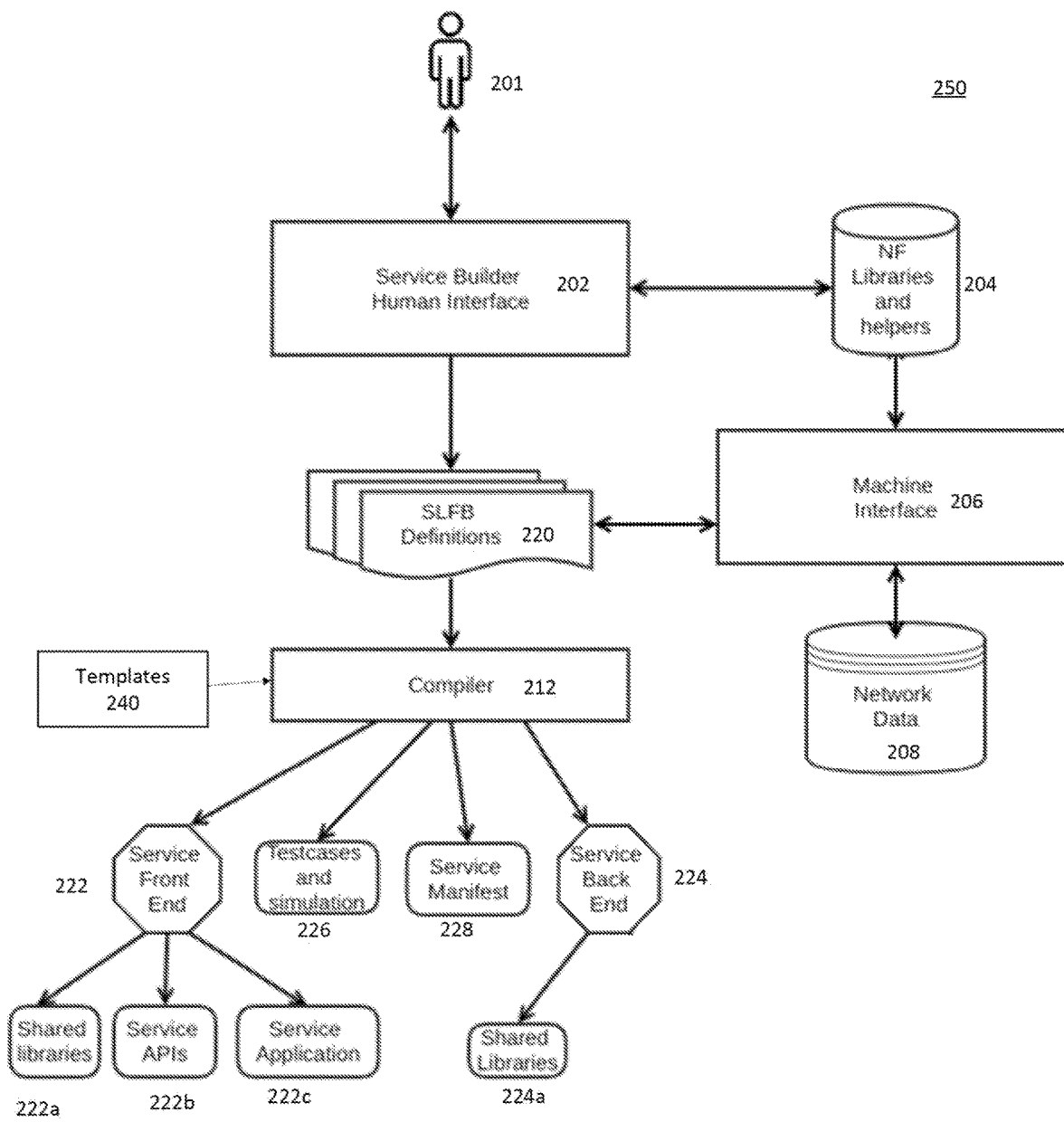
FIG. 2B is a block diagram illustrating a creator Tooling when the target is a Network Service.

FIG. 2B illustrates a system 250 for generating target codes for one or more NFs and services when the target is a network service or a Service. In FIG. 2B, a human interface 202 may be used to specify the service intent. The human interface 202 may receive input from a human operator 201 and use existing tooling helpers and libraries 204 of NFs to generate a definition for the Service.

Alternative to the human interface 202 is a machine interface 206 which uses machine learning to prescribe the service specification. The machine interface 206 receives input from either real time or pre-collected network data 208, instead of the human operator 201, and deduces the target intent. Similar to the approach taken by the human interface 202, the machine interface 206 utilizes target helpers and libraries 204 of NFs to generate the intent.

The service definition describes the intent that the service is to achieve in its datapath as well as control path. In one example, the service definition may be in the form of SLFB definitions 220, such as an extended ILFB definition. A compiler 212, which may be a processor, may receive SLFB definitions 220 and templates 240 as inputs, and generate: Service Frontend 222 as a service interface, which may be protocols or APIs to communicate with an external entity, and artifacts to be deployed at a CE; Service Backend 224 which may include a datapath interface to be described below, and artifacts to be deployed at the FE; Test cases and simulation 226 for executing the validation testing; and Service Manifest 228 which describes the manners to deploy the composition of NFs. The service front end 222 may include shared libraries 222a, service APIs 222b, and service application 222c. The service backend 224 may include shared libraries 224a.

In an embodiment, a system 200 is for generating target codes for one or more network functions for execution in a network. The system 200 comprises: one or more network definitions modules; one or more preprogrammed templates modules; and processor or compiler 212 configured to: receive a network function definition 210 from the one or more network function definitions modules; receive, at the processor or compiler 212, one or more templates 240 selected from the one or more preprogrammed templates modules, wherein the one or more templates comprises preprogrammed codes in a preset format; compile, at the processor or compiler 212, the network definition and the one or more templates by providing key terms or parameters from the network definition to the one or more templates 240; and generate the target codes based on the preprogrammed codes and the key terms provided from the network function definition 210.

In an embodiment, the system 200 further comprises a machine interface 206 in communication with the processor or compiler 212 for creating the network function definition.

Figure 2C:
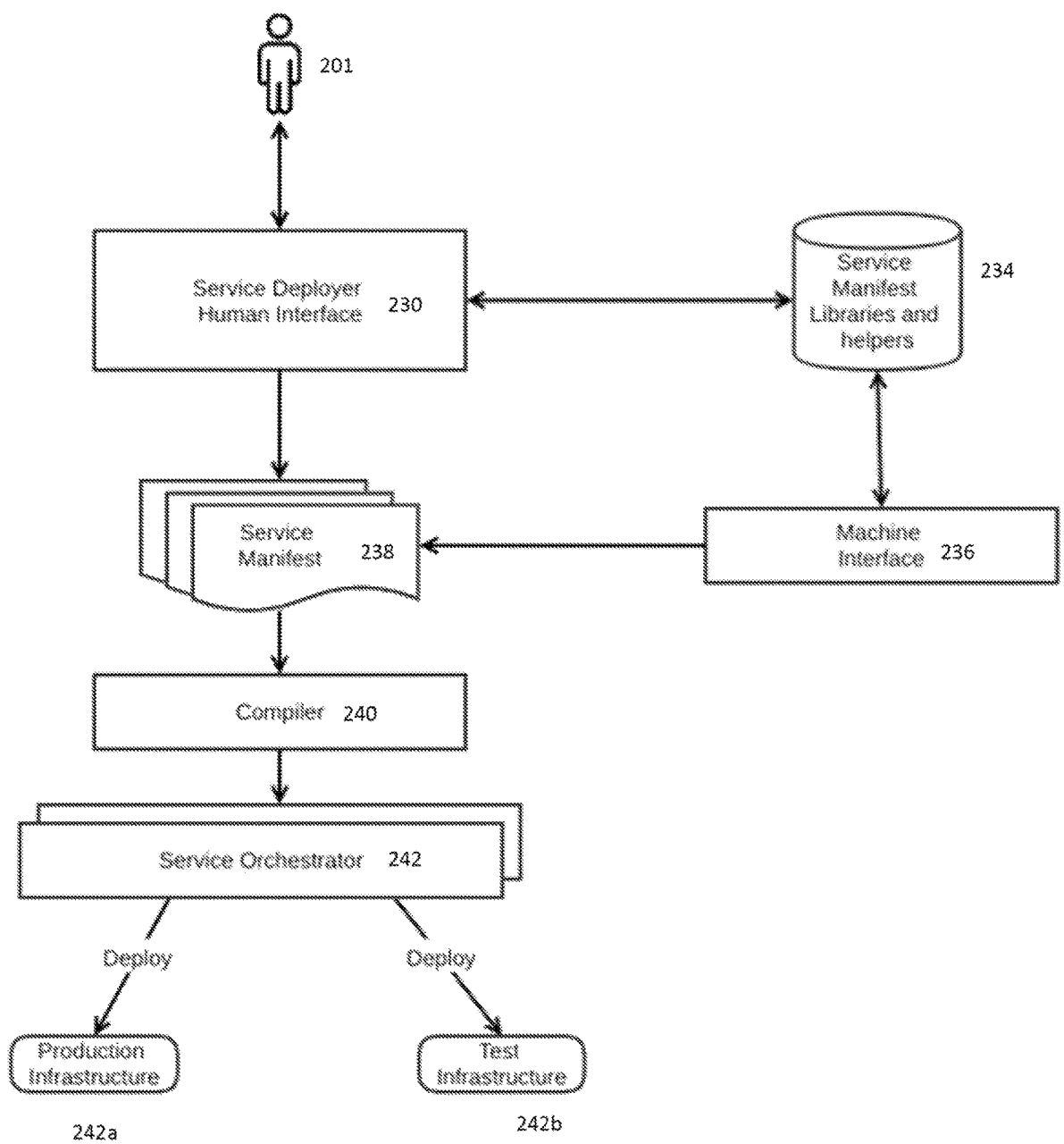
FIG. 2C is a block diagram illustrating Service Deployment.

In the present application, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit. In the present application, the network definitions modules and the templates modules may be a combination of a hardware processing circuit and machine-readable instructions for generating network definition 210, and the templates 240, respectively. FIG. 2C illustrates the abstraction for deploying services. In FIG. 2C, a human interface 230 may select from a library of service manifests and helpers 234 created by the Service Designer aided by service deployment tooling helpers.

Alternative to the human interface 230 is a machine interface 236 which may use machine learning to select the service to be deployed. The interface 236 may receive input from either realtime or pre-collected network data, instead of the human operator 201, and deduce the target intent. Similar to the approach taken by the human interface 230, the machine interface 236 may utilize tooling helpers and service libraries.

The service deployment compiler 240 uses the service manifest definition 228 as its input and generates instructions for a selected Service orchestrator system 242 on how to deploy the service. The orchestrator system 242 is dependent on the underlying sample space includes: Kubernetes, Openstack, etc. The orchestrator system 242 may deploy production infrastructure 242*a* and test infrastructure 242*b*.

Figure 2D:
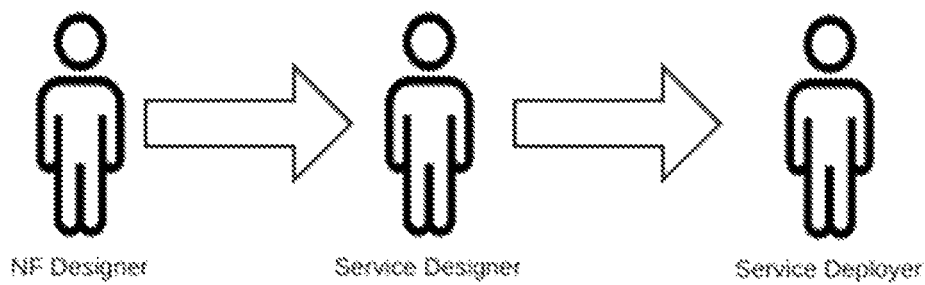
FIG. 2D is a block diagram illustrating different phases of the service creation and deployment.

FIG. 2D shows different phases of the service creation and deployment. In FIG. 2D, the NF designer defines and validates the NF, the service designer defines the NF composition for a Service as well as validating the Service based on the validated NFs, and the service deployer deploys the Service in the NFs of a given infrastructure.

Operator infrastructure, such as a plurality of processors or machines which can be used as a canvas for deployment can be repeatedly revised with respect to NFs and services.

The target codes generated in FIGS. 2A and 2B for one or more NFs and services may be implemented in a SDN system. Illustrated in FIG. 3 are three abstraction layers that are typically present in an SDN system 300: the service interfaces layer 302, resources layer 306, and resource interfaces layer 304 which bridge between the service interfaces layer 302 and the resources layer 306. At the top of the hierarchy reside services and applications 308. The interface at each of the layers vary in granularity and any protocols may be used for communication between different layers.

Services and applications 308 invoke service the resource control APIs, which may be utilizing a protocol like Hypertext Transfer Transport Protocol (HTTP), to actuate specific resource behavior or to simply request a snapshot of resource state and configuration; such a request will be delivered to a resource actuation interface, which may be utilizing a protocol such as ForCES, where it eventually is relayed to the underlying resource via one or more APIs.

Services and applications 308 may participate in collecting telemetry by either polling or request periodic telemetry data from the service interface 302. Likewise, the service analytics engine collects the telemetry data on its southbound interface by either polling or requesting for periodic delivery of data from the resource interfaces 304. The resource interfaces 304 will either periodically poll the resources for telemetry data or subscribe to resource telemetry related events (which are delivered asynchronously by the resources). Analytics data granularity gets more refined in the southbound direction and richer in contention aggregation in the northbound direction.

Figure 3A:
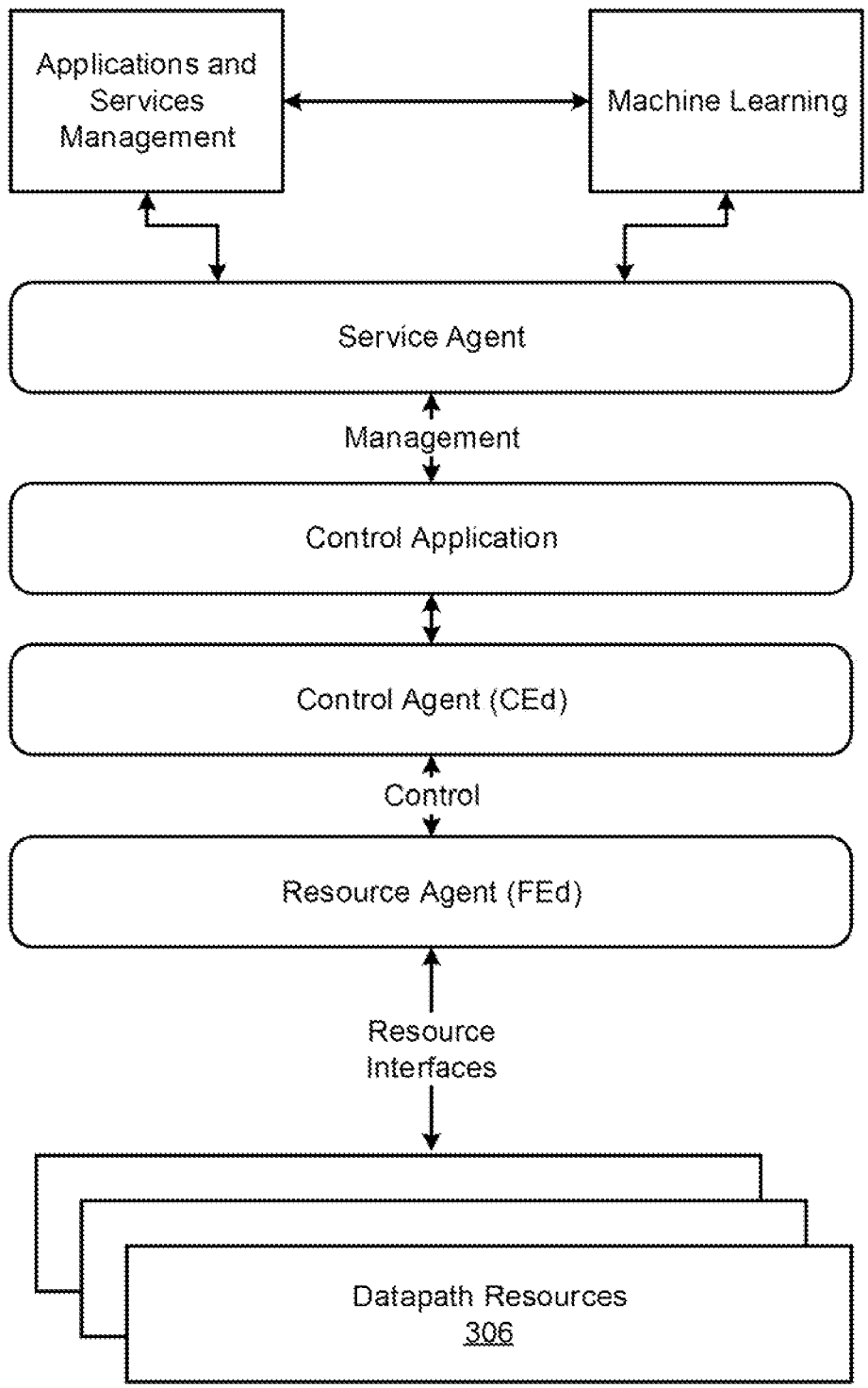
FIG. 3A is a block diagram illustrating an exemplary deployment scenario.

FIG. 3A illustrates an exemplary abstraction of a deployment scenario for FIG. 3. At the lowest layer of the abstraction are the packet processing datapath resources 306, such as ASICs, NPUs, software based datapath, etc. Typically, the datapath is colocated with a resource control agent (FEd in FIG. 3C). The resource agent (FEd) communicates with a control agent (CEd in FIG. 3C), typically using a protocol such as ForCES or OpenFlow is used between those two. On top of the control agent is a service agent that acts as a bridge between services and the control agent. On its north-bound, the service agent offers an interface for service applications. A service application may issue requests to a service agent which may be translated by the service agent as requests to one or more control applications. The control application in return will take a service agent's request and translate it as a request to one or more control agents. The request hierarchy continues with a control agent breaking down the control applications request into one or more resource agent requests. And finally, a request reaching the resource agent is submitted by the resource agent to the resource. It should be noted that all the indicated agents and applications as well as resources may reside in the same hardware but are typically distributed in order to allow for scaling.

Figure 3B:
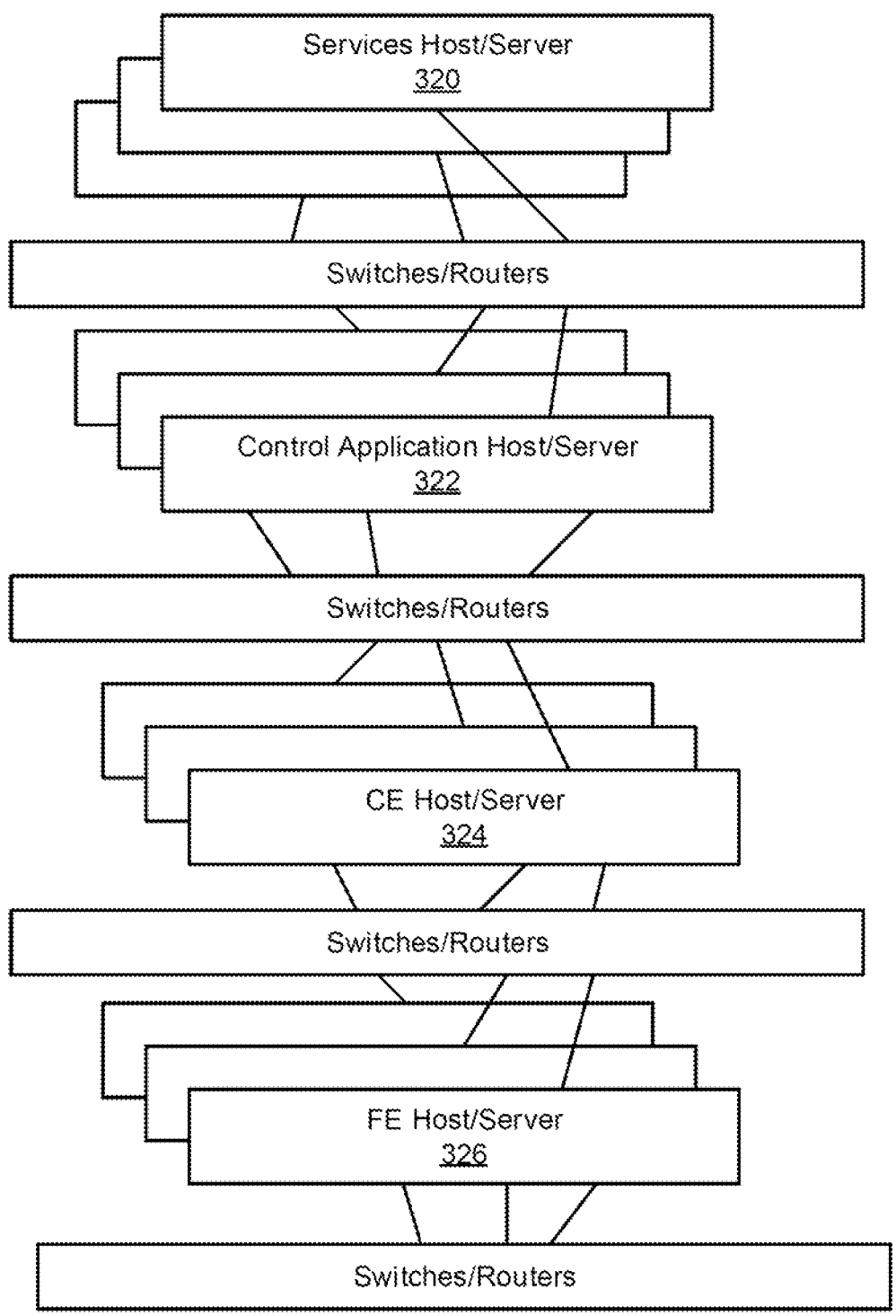
FIG. 3B is a block diagram illustrating a service Deployment system, according to an embodiment.

FIG. 3B illustrates an exemplary physical hardware or virtual distribution of the deployment described in FIG. 3A. Service agents and service applications may sit in the plurality of physical or virtual machines labelled as "Services host/server" 320. Control applications may reside in the plurality of physical/virtual machines labelled as "Control Application host/server" 322. Control agents may reside in the plurality of physical/virtual machines labelled as "CE host/server" 324. The resource agents may reside in the plurality of physical/virtual machines labelled as "FE host/server" 326 where the resources may also be colocated.

Network Function And Services

In the example, an IETF ForCES data model is used as the basis for defining Network Functions and Services control. ForCES Data model(RFC 5812) defines: 1) Operational Components to control the behavior of the resources/datapath as dictated by the control plane. Components can be created, read, updated and deleted via the control interfaces; 2) Operational Capabilities to describe the abilities and constraints of each LFB (example table sizes etc). Capabilities can only be read via the control plane interfaces; and 3) Operational Events to describe reports that are emitted by LFBs. Events can be subscribed-to via the control plane interfaces.

Figure 4A:
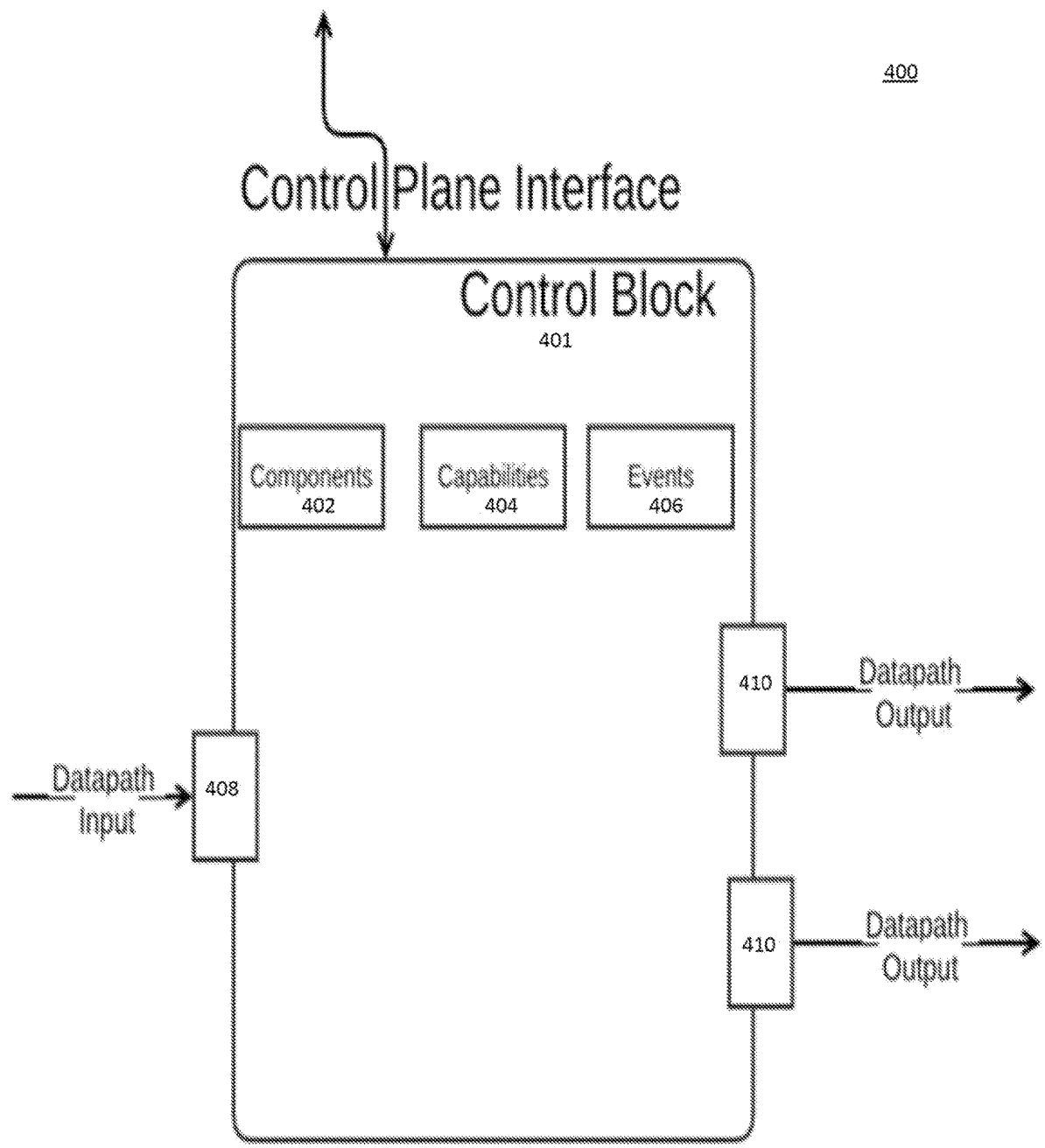
FIG. 4A is a block diagram illustrating an LFB abstraction as defined by the ForCES standard.

FIG. 4A illustrates an LFB abstraction 400 as defined by the ForCES standard. LFB abstraction 400 may include a control block 401, which may include Operational Components 402 for controlling the behavior of the resources/datapath as dictated by the control plane, Operational Capabilities 404 for describing the abilities and constraints of each LFB, such as table sizes etc., Operational Events 406 for describing events that are emitted by LFBs. datapath Input ports 408 and datapath Output ports 410 along with description of allowed data and metadata. Events 406 are subscribed to by the control plane.

In some examples, the ForCES LFB may further include a separation of control and datapath blocks as coupled blocks; additional ports at the control entry points to allow for control data as input/output (see FIG. 3B and FIG. 4), or ports only for the datapath (See FIG. 4A), access control for both control and datapath to differentiate CRUD(Create/Read/Update/Delete) permissions for operational components as applied from either the control plane or data plane, formalized LFB Ports to include a definition that allows parsing in the input direction and deparsing in the output direction; an optional "program" construct to the data model, Programs are associated with either datapath or control ports, and various types of programs can be defined (as will be described later—see FIG. 3B and FIG. 4); Infrastructure LFB(ILFB) and Derived LFB(DLFB), ILFBs are tied to resources whereas DLFBs are tied to (re)modelling based on derivations from one or more ILFB; and Service LFBs (SLFB), which is a specialized DLFB that constitutes a composition of ILFBs in a graph.

With these new semantics for both data and control paths, code generation can be formalized for both the datapath or resource level as well as the control level.

Network functions (generated from LFBs) are executed on Execution Engines (EEs) residing on Forwarding Elements(FEs). An Execution Engine (EE) is "a resource canvas for execution of NFs".

There are two types of EEs: 1. Pre-populated EEs, which are typically "fixed NFs". Examples of such EEs are implementations of NFs in ASICs or software that is not dynamically replaceable. Such functions come pre-packaged with the underlying operating environment; IOW, they are available whether you use them or not and have long lifetimes (i.e replacing them takes relatively longer time and effort). For hardware variants, such types of functions are built into ASICs. For software variants, such types of functions can be in-kernel code that can only be changed after going through a lengthy exercise of developer interfacing.

2. "Open Canvas" EEs, which are EEs allowing for either arbitrary NF execution (example in CPUs, GPUs) or a specific type of NF (e.g. P4 match/action based NFs). Dynamic functions are ILFBs that can be loaded on demand and executed at runtime on behalf of a service. For hardware, dynamic programs which can be loaded on a hardware "canvas" fit this description. For example, P4 hardware, FPGAs or other infrastructures like smart NICs can be used for such functionality. For software, kernel modules, ebpf code or even user space code fit into this category.

Figure 4B:
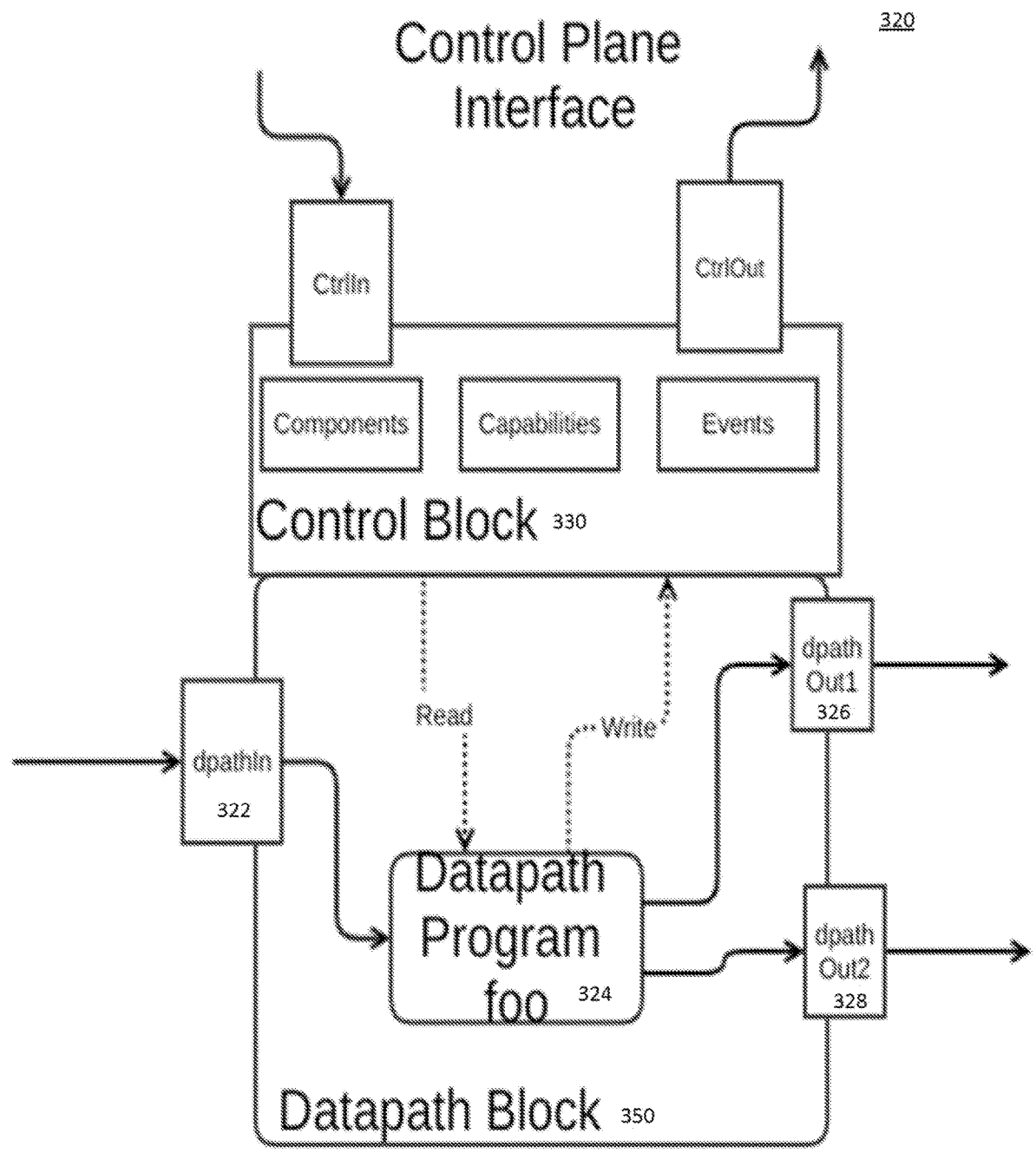
FIG. 4B is a block diagram illustrating an ILFB structure, according to an embodiment.

A Network Function is modelled as an ILFB. FIG. 4B illustrates an ILFB structure, according to an embodiment. An LFB class is defined using the ForCES data modelling language. Once an LFB class is instantiated at runtime, the control block allows access to the LFB instance's Components, Capabilities, and Events.

The control block data is shared by the datapath (east-west) and the control path (north-south). The control path reads, writes, or deletes control constructs (such as LFB components) and the datapath uses control constructs.

As illustrated in FIG. 4B, the NF resources are interfaced-to via the control and data planes. The control elements or artifacts are defined using the ForCES data model.

In FIG. 4B, LFB ports are unidirectional. LFB ports ingress data and metadata into an LFB to an LFB program, and/or egress data and metadata from LFB programs out of the LFB. These rules apply to the ports of both a control block and a datapath block (see FIG. 3B).

FIG. 4B shows LFB ports at both the traditional East/West direction dpathin and dpath out1 and dpathout 2 as specified by the ForCES standard.

On every ingress LFB port, a parser abstraction extracts necessary data and metadata from the input as pre-determined and feeds the extracted data and metadata to the attached program. The parser recognizes the relevant data as specified in the LFB definition which describes the data or metadata type (which describes the size as well) and where to find it on input. An optional instantiation-time or run-time filter can be used to further refine the specified data allowed in.

FIG. 4B illustrates a single datapath input port("dpathIn") 322 feeding into a datapath program "foo" 324 and two egress ports "dpathOut1" 326 and "dpathOut2" 328 that are fed data and metadata by the same "foo" program 324.

At every egress port 326 or 328, there is an optional deparser abstraction which may be used to construct and format the data and metadata that is expected out of the LFB port.

From a datapath resource perspective, each NF is embedded with programmable intelligence, such as Datapath Program foo 324 in FIG. 4B. The runtime "Program" may be implemented by a processor, and is essentially the resource mediator; the runtime "Program" reads the control information to decide on the treatment of incoming data and/or metadata and on results to send out to the egress ports. The "Program" may update the control block 330 by updating state information or generating events towards the control path.

The LFB "ports" 322, 326, 328 in FIG. 4B (whether East-West or North-South direction) allows different programs type instances attached to those ports. As an example, a sample NF may expect packet data at Layer 2 alongside associated metadata which specifies the protocol of the packet data. An LFB program at the socket layer on the other hand may have very different expectations and signature, both defined by the "port" details.

FIG. 4B illustrates a control block 330, where control data resides, accessed on its north by control applications (or other LFB control blocks). The control interface used by control applications, per ForCES specs, may have two types of APIs: request-response (RR) and publish-subscription (PS) of events.

Figure 4C:
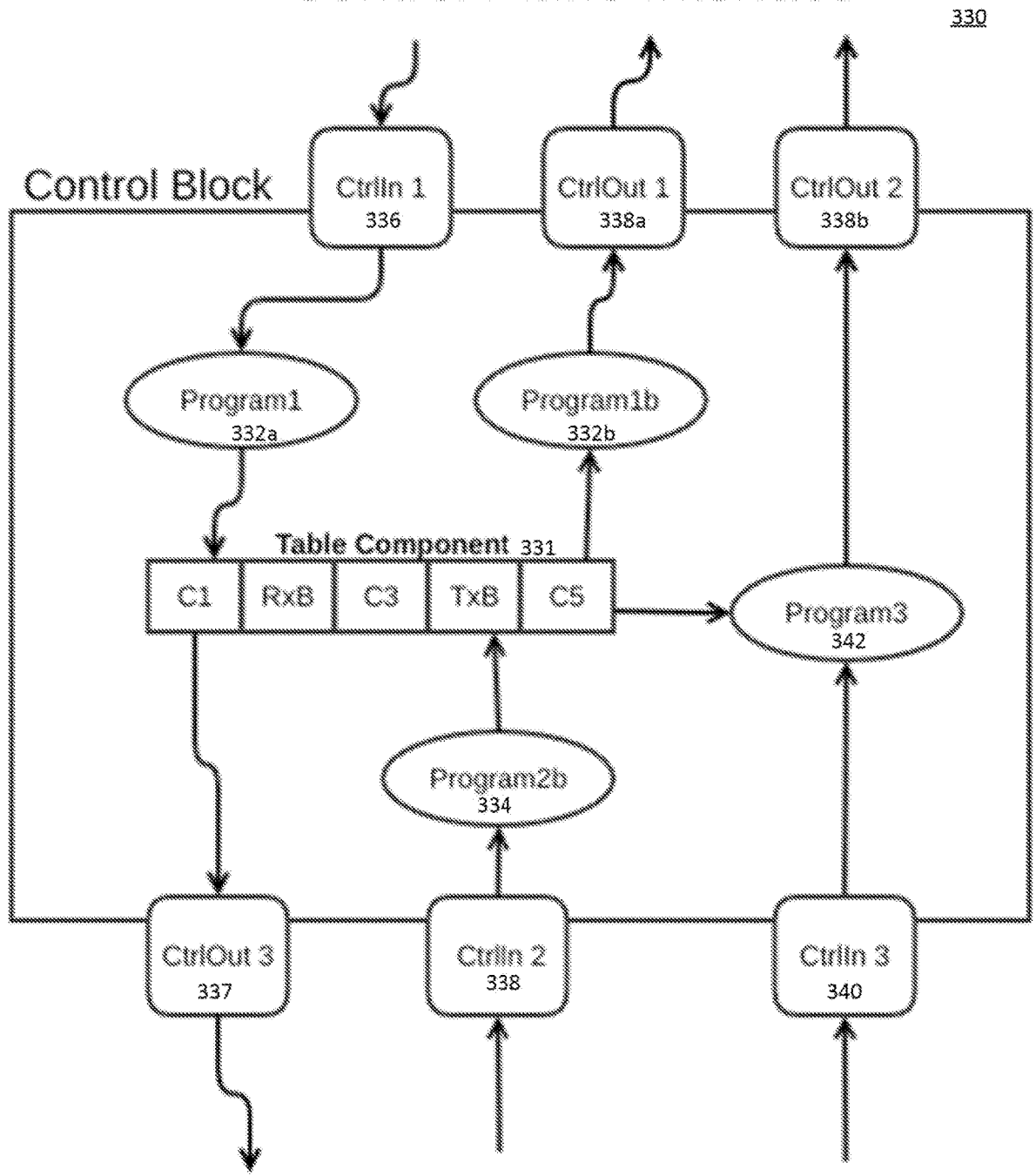
FIG. 4C is a block diagram illustrating a control block structure, according to an embodiment.

FIG. 4C details a control block 330 exposing a more elaborate use of programs and input/output ports. For illustration purposes both northbound and southbound of FIG. 4C show a control plane interface where control applications or other upstream or downstream LFB control blocks may access the illustrated control block via the input and output ports. Downstream or upstream control applications or LFB blocks may use ForCES semantics for reading and writing which manifest as request-response (RR) or publish-subscribe (PS) interfaces. For illustration purposes, a simple operational component in the form of a table 331 is shown. The table 331 may be written to by control applications or other LFB control blocks via program1 332a or program2b 334. The table 331 can be read from via program1b 332b or program3 342. The "CtrlIn" ports 336, 338, and 340 are used to abstract the interface from the control applications and other LFB control blocks to control block 330.

CtrlOut1 and CtrlOut2 ports 337, 338a and 338b are used to illustrate the 10 towards control Applications or other LFB blocks. From a ILFB perspective, both the "CtrlIn" 336 and CtrlOut 1 and Ctrlout 2 ports 338a, 338b abstract both of the RR and PS interfaces.

In FIG. 4C, a "program" is attached to either the CtrlIn 1 port 336 or CtrlOut 1 338a or CtrlOut 2 port 338b. This is in concert with the model extension of an optional "program" attached to either input or output port illustrated in FIG. 3B. In an ILFB, these programs are intended to perform transformation of the data incoming to the LFB instance control block 330 or outgoing from the LFB instance control block 330.

Although FIG. 4C uses a control block 330 as an example, the principles described in FIG. 4B are applicable to both resource blocks or datapath blocks 350 in FIG. 4B.

For example, in FIG. 4C, incoming data from the applications (or other LFB control blocks) arrives at CtrlIn 1 port 336. The input CtrlIn 1 port 336 first parses the incoming data for the data and metadata of interest. The data and metadata is then passed on to program1 332 which transforms data and metadata into a format suitable for storing into the operational table component 331.

As illustrated in FIG. 4B, the datapath may trigger reading of one or more operational table component 331 (or a subset of the component) which is delivered via CtrlOut 3 port 336 to the resource/datapath. In this example, the "program" components program1, program 1b, and program2b are optional.

The applications and connected control blocks may also write to the operational table component 331 by submitting via CtrlIn 2 port 338, which parses data and passes on to Program2b 334 which transforms the data into the table component for storage at table component 331.

The control block 330 may also be triggered to generate an event either by a timer or other triggers. This may result in a program reading one or more components from table component 331, transforming the data, and then transmitting the transformed data out via a port, for example, CtrlOut 1 338a.

Derived LFB(DLFB)

In some examples, the LFB may be a derived LFB (DLFB), which is a meta LFB deriving its constructs from one or more ILFBs. Sometimes, different operational views from multiple LFBs are needed to formulate service intents as well as rich control applications. DLFBs provide a virtual view of resource data derived from one or more LFBs.

To model such virtual views, we borrow ideas from the world of database "views" with some caveats:

- Extend the "view" concept to be centered around LFB constructs (instead of SQL table focus). In the database view world the result constructs are "virtual" tables whereas DLFBs are equivalent to "Virtual" LFBs.
- A DLFB component is stored unlike in database views where they are dematerialized (not stored but rather reference derived values).
- In database views the virtual fields are "selected" runtime entities; whereas in the case of DLFBs they are derived as definitions. Runtime mapping of values to views happens after a DLFB is instantiated.
- A DLFB component has directionality(read-write) whereas a database view is typically read-only (You could do writes on table views if the key is part of the view but that use case is uncommon).
- A DLFB component value can undergo a variety of transformations at runtime (by the program) before it is written-to or after it is read from; whereas a database view of a field, when possible to write to, undergoes an identity transformation since it is identical to its original storage.

DLFB Sample Use Cases

In this section we demonstrate a few examples of DLFBs control blocks. The figures show the control ports in the east-west flow direction instead of north-south for convenience of illustration.

Figure 5:
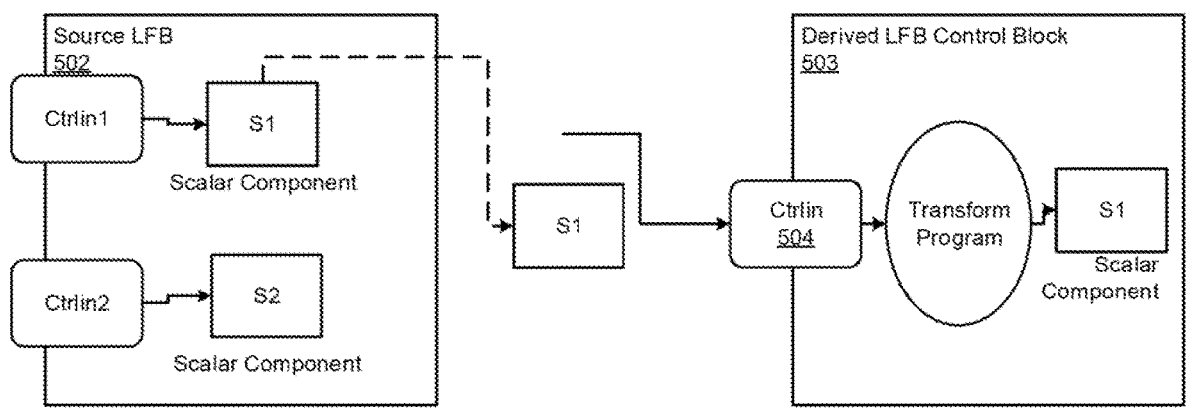
FIG. 5 is a block diagram illustrating derivation of a DLFB which uses a subset components of a source LFB with an identity transform.

FIG. 5 shows derivation of a new LFB which uses a subset of another ("Source") LFB's components with an identity transform. In FIG. 5, a simple source LFB 502 definition with two scalar components S1 and S2. The source LFB 502 is a DLFB. The DLFB derives the S1 component from the source LFB 502. The DLFB control block 503 input port CtrlIn 504 expects only the S1 component as input, and its associated parser rejects any input that does not match the S1 component data.

Figure 6:
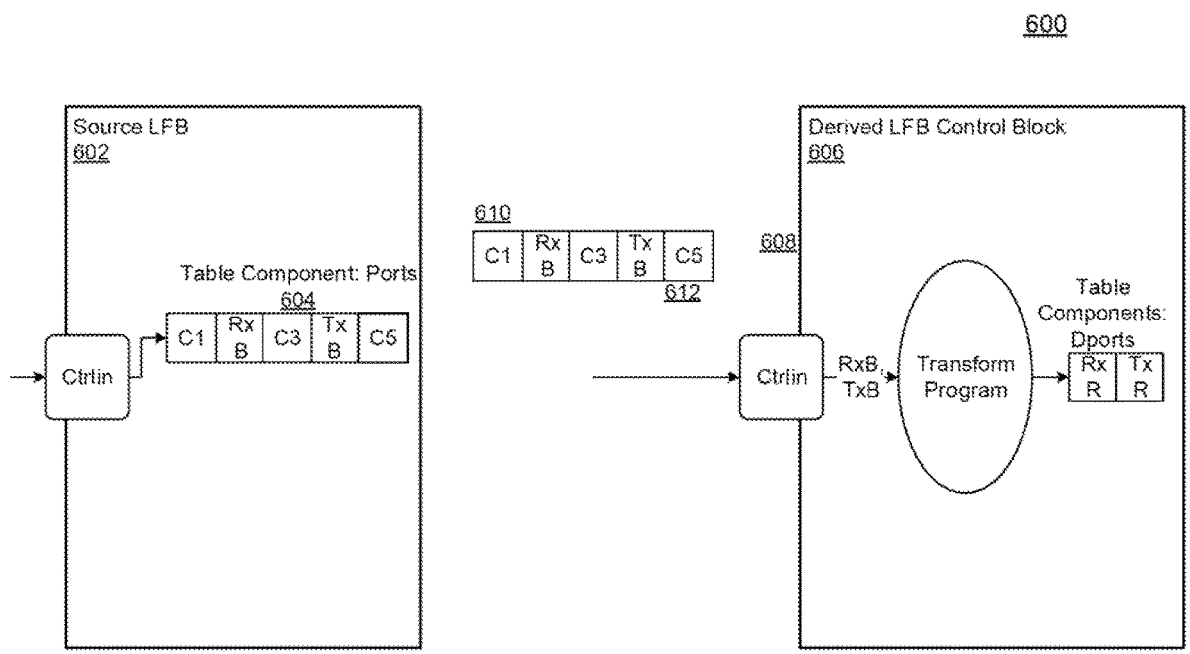
FIG. 6 is a block diagram illustrating a DLFB Vector transform, according to an embodiment.

FIG. 6 shows a source LFB 602 with a defined table component named ports 604. the DLFB control block 606 is derived from source LFB 602. The DLFB has a component (table) Dports 608, which have two components RxB and TxB.

The DLFB 606 in FIG. 6 accepts as input one or more unmodified rows of the ports table 604 in its input port CtrlIn 610. The parser of CtrlIn port 610 is configured to extract two components from each incoming ports table row, namely: RxB and TxB. The port CtrlIn 610 then transforms, by the transform program 612, the values of two components, for example, by computing rate over time and uses the results to update relevant row content on Dports/{RxR and TxR}. Computing the rate of a variable over time is a common operation in analytics for example.

Figure 7:
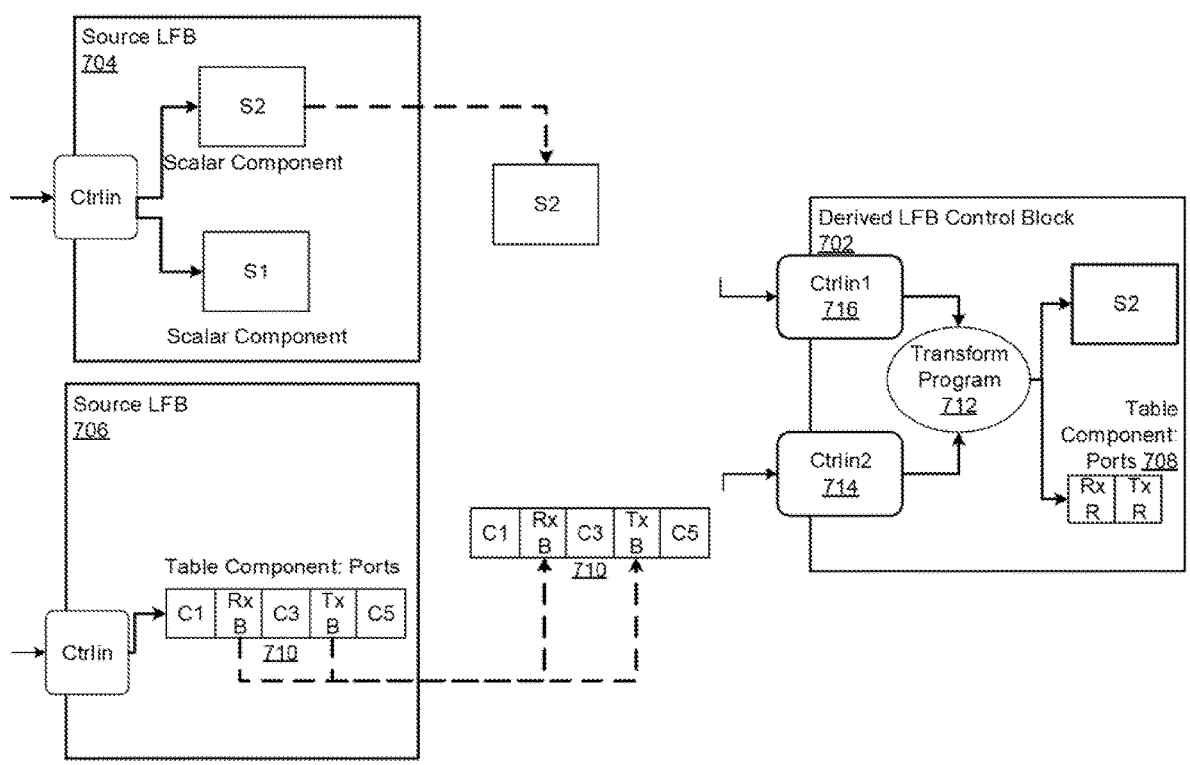
FIG. 7 is a block diagram illustrating defining a DLFB using two source LFB s.

FIG. 7 illustrates that a DLFB 702 is defined by using two source LFBs 704 and 706. The DLFB 702 adopts a scalar component S2 from the LFB 704 and a vector table ports from the LFB 706.

The DLFB 702 in FIG. 7 has a component or table Dports whose rows have two components RxB and TxB, which are a transformation from the ports table 710 of the source LFB 706 (component RxB and TxB). The DLFB 702 also has a scalar component S2 which is derived using the identity transform from its source LFB 704. The input ports of the DLFB 702 know how to parse relevant data and pass the parsed data on to the transform program 712. For example, port CtrlIn2 714 extracts the RxB and TxB components only from the incoming table data 710, and port CtrlIn1 716 parses scalar component S2 from the incoming data from LFB 704.

Figure 8:
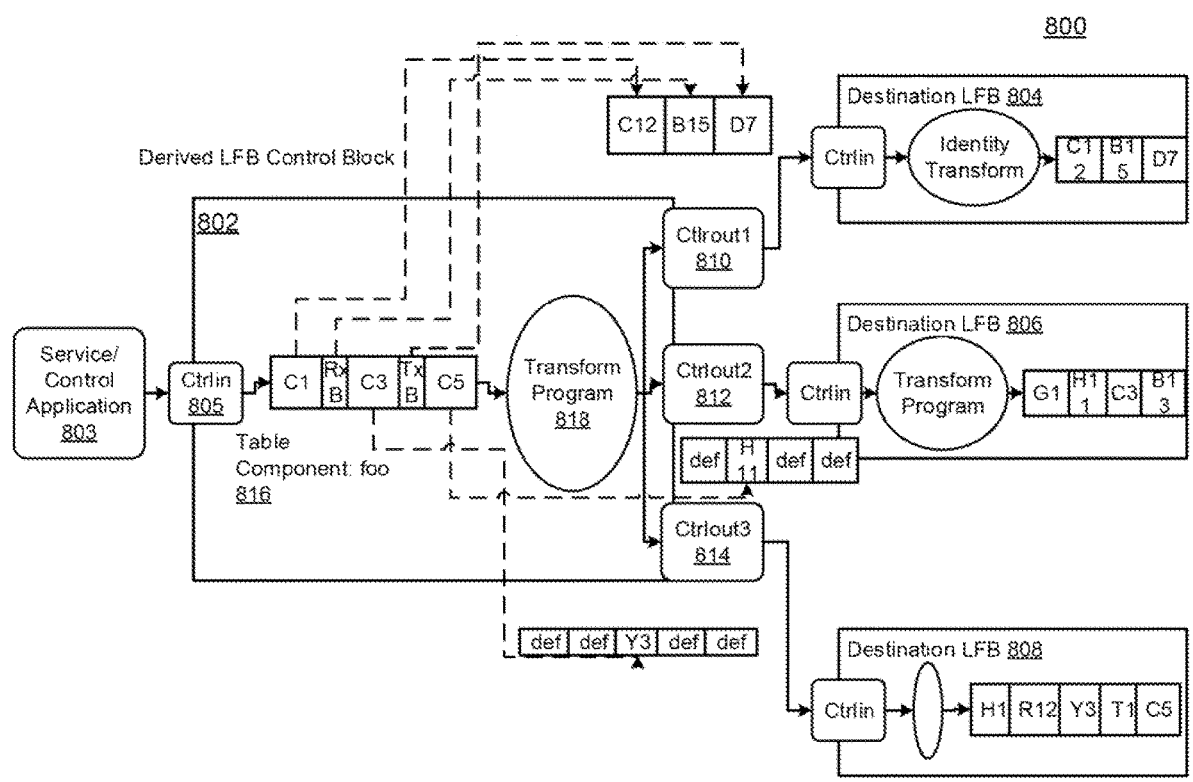
FIG. 8 is a block diagram illustrating a use case where a DLFB is used as the source LFB and performs different transforms for different target destination LFBs.

FIG. 8 illustrates an exemplary use case 800. In FIG. 8, a DLFB 802 is used as the source LFB and performs different transformations for different target destination LFBs, such as 804, 806 and 808. The use case 800 fits into a "service" LFB, which will be discussed in greater detail below. The service LFB is similar to this illustration of abstracting multiple LFBs from a source service LFB. In the use case 800, the transformation occurs in the outgoing direction towards the CtrlOut1 port 810-CtrlOut3 port 814.

In FIG. 8, a runtime service application interacting with the depicted DLFB instance. The DLFB instance control block 802 transforms requests from the service/control application 803 via CtrlIn port 805 referencing the table component foo 816 to map to 3 different downstream (infrastructure) LFB instances 804, 806, 808 by using transform program 818. For example, ForCES has very simple APIs: GET/SET/DEL and the program 818 accepts those inputs and then translates them into requests to downstream LFBs. In an example, when a GET, SET or DEL operation is issued by the service 803, the DLFB instance transformation program 818 may issue one or more, for example 3, transactions, one to each downstream LFB to different destination LFB instances. The requests issued to the destination LFBs 804, 806, 808 may have some of the fields set to default values since the DLFB is only interested in a subset of the fields. Responses from all the destination LFB instances are merged before the application is responded to. More details on how a "service LFB" operates will be provided later.

Example DLFB

The example below shows a DLFB derivation using YAML. Other data models may also be used for a DLFB derivation, for example, using an extended RFC 5812 data model which uses XML.

The YAML prescription below describes an example of a "HistoGram" DLFB, which is derived from the Hflow LFB. A plurality of stanzas are used to prescribe a DLFB, including:

A list of LFB Components, LFBComps;
  A list of LFB Capabilities, LFBCapabs;
  A list of LFB Events, LFBEvents;
  A list of LFB Input ports, LFBInputs;
  A list of LFB Output ports, LFBOutputs; and A list of LFB Programs, LFBProgs.

Listing1 below describes an example of details of an LFB named "HistoGram".

Listing 1: Derived LFB Sample

```
LFB:
Id: 7689
Name: "HistoGram"
LFBComps:
- Comp:
        Name: "HG"
        Id: 1
        Type: "Array"
        Struct:
        - From: "/hflow/flows/rtt"
                Name: "myrtt"
        Id: 1
LFBCapabs:
- Comp:
        Name: "HGcap"
        Id: 41
        Struct:
        - From: "/types/float"
        Name: "min"
                Id: 1
    - From: "/types/float"
                Name: "max"
                Id: 2
    - From: "/types/uint32"
                Name: "bins"
                Id: 3
    - From: "/types/bool"
                Name: "cumulative"
                Id: 4
                default: "true"
LFBEvents:
    baseID: 60
    Events:
    - Event:
Name: "HGReport"
Id: 1
Watch: "HG/*"
WatchFor: "Changed"
ReportInfo: "HG/*"
LFBInputs:
    - LFBInput: "CtrlIn"
        Id: 1
        AllowedData:
    - From: "/hflow/hflows"
            Extract: "rtt"
LFBProgs:
    -Prog:
        Type: "Instantiate"
        Id: 1
        Name: "HGInstantiate"
    -Prog:
        Type: "Transform"
        Id: 2
        Name: "HGTP"
        Hook: "LFBInput/CtrlIn"
```

In the example above, in the LFBComps, the HistoGram LFB defines a table named "HG" with a single column of a component named "myrtt" which is derived from the "hflow" ILFB "rtt" component, which is found in the "flows" table row component of LFB "hflow").

In LFBCapabs, the HistoGram LFB defines several capabilities which specify the behavior of HistoGram LFB. For example, the "bins" capability component defines the number of buckets or rows of the table "HG" will be present. The "min" and "max" capacities define respectively the HistoGram's lower bound used in bucketing (inclusive) and upper bound(exclusive). The number of bins and the range derived from the "min" and "max" values define the width of the "HG" bucket of equal size. The capability flag "cumulative" will define whether the HistoGram will be cumulative (CDF) or not. In this example, the HistoGram is set to be cumulative.

In LFBInputs, a single "LFBInput" port named "CtrlIn" is defined. This port will accept data structures in the form of "hflow" LFB "hflows" table rows. "hflow" table data coming in "CtrlIn" will have its "rtt" data extracted then presented to the program "HGTP" defined in LFBProgs. The program "HGTP" will then use "rtt" value and update a counter "myrtt" in specific index of table "HG". Program "HGTP" derives its selection of the array index based on the received "rtt" value. In this example, the program "HGTP" may be present either as a predefined library or a "helper" 204 in FIG. 2A.

Services

Figure 9:
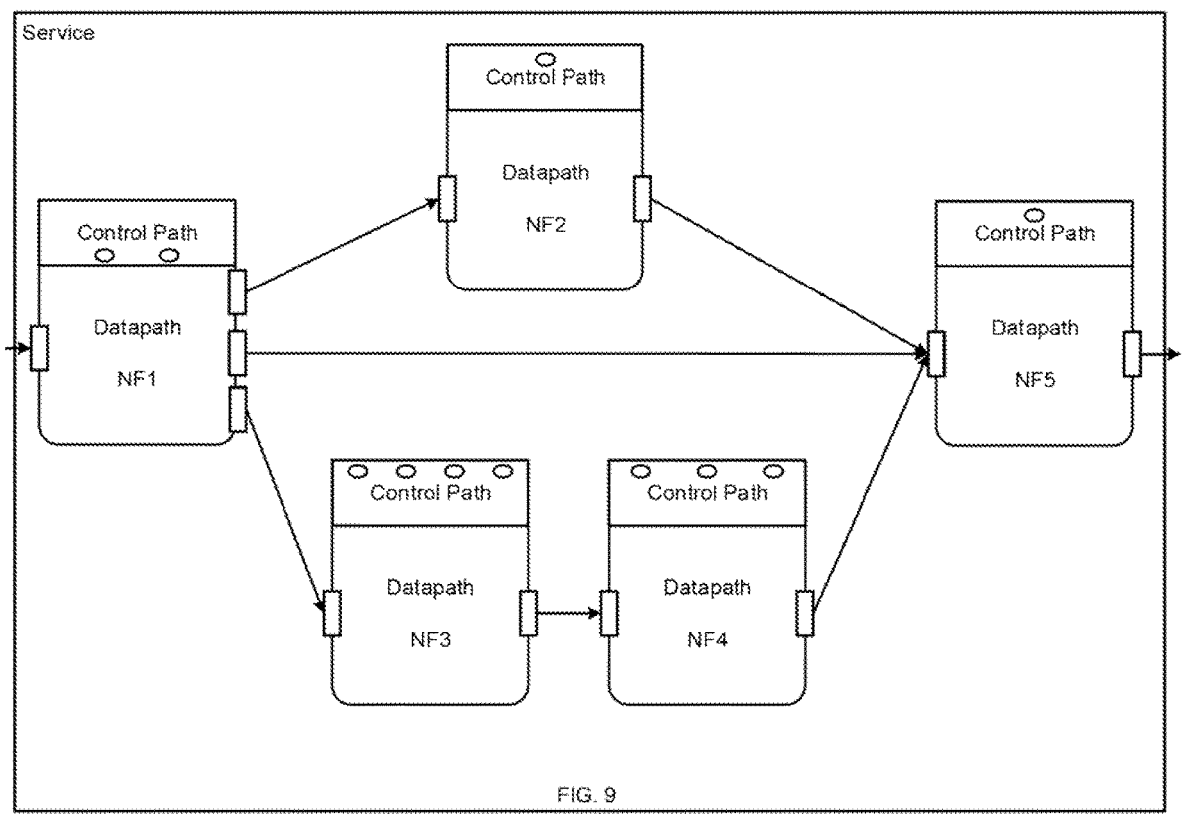
FIG. 9 is a block diagram illustrating a sample service class, according to an embodiment.

A service LFB class serves as a blueprint from which service instances are created at runtime. A service LFB class may include a coupling of:

A graph of ILFBs which process packets as per specified service intent (see FIG. 9).

A special multi-dst DLFB (see the example in FIG. 8) on the control plane (North-south) that defines service control knobs derived from specific ILFBs that are part of the service composition.

Service Definition And Abstraction

FIG. 9 illustrates an example of a service class comprising 5 NF classes NF1-NF5 in a graph. In FIG. 9, the entry point for the service starts with NF1 and egresses at NF5. Data and metadata flows NF1 to NF5, namely from east to west. The NFs 1-5, based on their functionalities, may have varying inputs and outputs. For example, NF1 has three outputs and may transition data and metadata to one of NF2, NF3 and NF5, depending on runtime state or service configuration, and NF5 has input coming in from any of NF1, NF2 and NF4. In the example of FIG. 9, NF2, NF3, NF4 each has a single input and output port.

Sample Modelling: BW1

FIG. 10 is an example of modeling of a service "BW1" illustrated which provides bandwidth services for subscribers in both an upstream direction from subscriber to the service provider system as well as a downstream direction from the service provider system to the subscriber. Subscribers are provisioned via the service interface for different up or downstream rates, for example, 1 Mbps upstream and 10 Mbps downstream or 2 Mbps upstream and 20 Mbps downstream, etc.

In the example of FIG. 10, the "BW1" service 1100 comprises a BW1 Service LFB Control Block 1100a, and a BW1 service LFB Datapath Block 1100b. The BW1 service LFB Datapath Block 1100b includes two Policer ILFBs 1102 and 1104, and two Dropper ILFBs 1106 and 1108. The Policer ILFB 1102 and 1104 receives at its input port, pol-in 1102a and 1104a, a packet, which may include two metadatum: "serviceid" and "pktlen". The metadatum "serviceid" is translated by the Policer ILFB to a "Policer index" component which is used to lookup a configured Policer instance state. The metadatum "pktlen" specifies the size of the packet and may be used for computing cumulative bandwidth utilization as well as the burst. If the "BW1" service determines that the cumulative bandwidth or burst of the packet exceeds the predetermined threshold values, then the packet is sent out to the port "Exceeded" 1102b or 1104b, else the packet is sent out to the port "Conform" 1102c or 1104c.

If the cumulative bandwidth or burst of the packet exceeds the predetermined threshold values, the Dropper ILFB 1106 or 1108 receives packets at its input port "drop_in" 1106a or 1108a and drops the packet. The Policer ILFB 1102 is named as "up_pol", and the Policer ILFB 1104 is named as "down_pol". and the Dropper ILFBs 1106 and 1108 are named "drop_ingress" 1108a and "drop_egress" 1106a.

The "BW1" service intent may be provided by control interface 1100a, for example, by configuring the following parameters:

1. A "serviceid" which uniquely identifies type of service subscribed by a subscriber;
2. "up_rate" defining service upstream rate of the subscriber;
3. "up_burst" defining service upstream burst size of the subscriber;
4. "down_rate" defining service downstream rate of the subscriber; and
5. "down_burst" defining service downstream burst size of the subscriber.

These parameters are transformed at the transform program 1120 to map to specific parameters of the ILFBS 1102, 1104, 1106 and 1108.

The Serviceid selection used as input into "BW1" 1100 may be achieved by several approaches, including:

- An IP address, for example, a source IP address towards "from_ingress" 1112 and a destination IP address towards "from_egress" 1114 direction;
- A subscriber MAC address, for example a source MAC address towards "from_ingress" 1112 and a destination MAC address towards "from_egress" direction 1114.
- A PPPOE session, for example an ID at "from_ingress" 1112 and the subscriber destination IP in the downstream "from_egress" 1114 direction, etc.

In some examples, the Serviceid is set as metadata at the input ports 1112 and 1114.

The resulting service abstraction 1100 in the SLFB model is used to generate the appropriate code and deployment manifest needed to fulfil the service.

Developer-Less

The present application discloses systems and methods for NF Code generation, analytics code generation, tooling for Service Generation and deployment, and improving the application API usability by introspection. As such, the systems and methods reduce the involvement or needs for human developers for these purposes.

Figure 11:
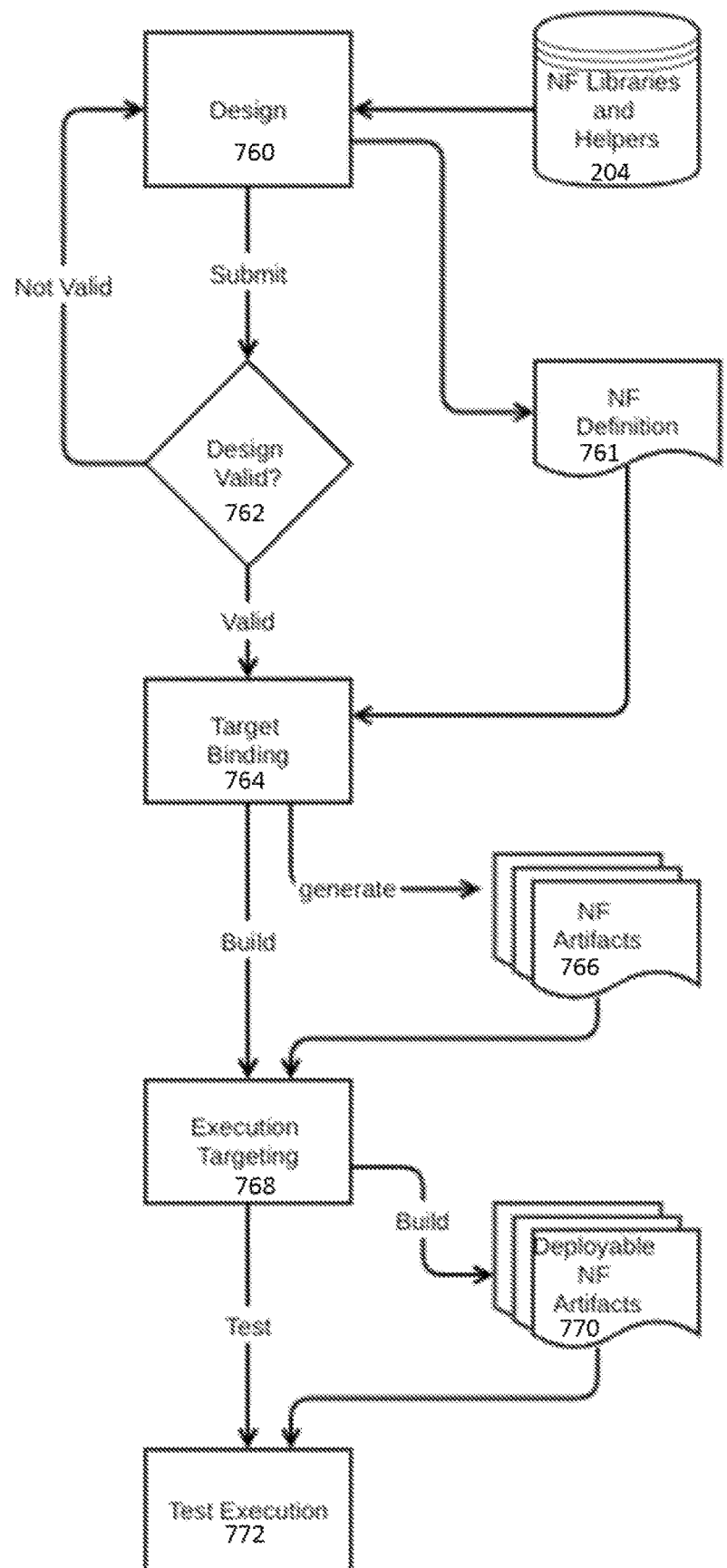
FIG. 11 is a block diagram illustrating a workflow involved in creating and testing a new NF, according to an embodiment.

As described above, FIG. 2a illustrates a system infrastructure 200 for generating target codes and creating network functions. In an example, FIG. 11 illustrates a workflow involved in creating and testing a new NF.

In the field of network functions, the workflow of a human operator 201 is as follows:

1. At step 760, the human operator 201 designs the NF via the human interface 202 such as a graphical user interface (GUI). The human operator 201 may use NF libraries and Helpers 204, including selecting pre-designed NFs for derivation, etc.
2. The human operator 201 commits the design on the GUI by clicking "submit".
3. The GUI 202 consults its backend to validate the design at step 762 for any constraints:
   If there are any issues, an appropriate error message is presented to the operator 201 and control is returned to the design stage.
   If no issue is identified, the GUI backend creates an ILFB definition 761.
4. At step 764, the human operation 201 may bind or create the target. For example, the human operator 201 selects the target such as P4, a vendor ASIC, etc. and clicks on "Generate" on the GUI 202 to generate NF artifacts 766. Using the ILFB definition as input, all the necessary artifacts, including codes, Makefiles, etc., for the selected target are created. In addition, a test manifest is also created.
5. The human operator 201 selects the targets (CPU architecture) for the controller, FE and application plane and then clicks on "Build". At this point the GUI invokes its backend to use the artifacts in step 4 to compile, if necessary, all the generated code using the appropriate CPU(ARM, x86, etc) targets selected. It is also at this stage that the code for the datapath execution is also built. At step 768, the human operator 201 may test target codes in a target execution environment. After step 768, deployable NF artifacts 770 are generated and ready to deploy.
6. At step 772, the human operator 201 may test the execution of the resulting deployable artifacts 770 by clicking on "test". At that point the artifacts built in step 5 are deployed to a virtual environment using the GUI's backend. Tests generated in step #4 are executed for validation purposes. The user is presented with the results at the end of the test run.

Step 1: Human Interface For NF Creation

In an example, the human operator is to create a representation of FIG. 4B. An example workflow for step 1 above includes:

creating a canvas for the NF by an operator; and
Selecting LFB items. For example, the operator can drag and drop LFB items from a selection onto the canvas via a GUI. The GUI allows the operator to interact with the helpers and other existing ILFBs for either extending the helpers and other existing ILFBs or creating DLFBs. Items that can be dragged and dropped into the canvas include:
a) Control Block
b) Datapath block
c) Ports that get attached to either control or datapath.
d) Define components, Capabilities and events. Define CRUD permissions on how both the datapath block or control block access these control entities.
e) Defining datapath or control block programs and their connectivity to defined ports.

Sample Generated LFB Model

Once the operator clicks on the "submit" button, and the design meets the expected constraints, an LFB data model is generated. The example below shows a sample generated LFB Listing3A. The LFB name is "example" and its ID is 1234. The LFB has two operational components:

an unsigned 64 bit packet counter (named packetcount) for read and update operations.
a command that is sent to hardware (named command).

Listing3A: Sample Generated LFB Data Model

```
<LFBLibrary xmlns="urn:ietf:params:xml:ns:forces:lfbmodel:1.0"
    xmlns:xsi="http://www.w3.org/2001/XMLSchema-instance"
    provides="Example">
<LFBClassDefs>
    <LFBClassDef LFBClassID="1234">
        <name>Example</name>
        <synopsis>
            This LFB is an example, for illustrative purposes.
        </synopsis>
        <version>1.0</version>
        <components>
            <component componentID="1" control-access="read"
                    resource-access="read update">
                <name>packetcount</name>
                <synopsis>Count of packets processed</synopsis>
                <typeRef>uint64</typeRef>
            </component>
            <component componentID="2" control-access="update"
                    resource-access="read">
```

Listing3A: Sample Generated LFB Data Model

```
                <name>command</name>
                <synopsis>Command to the hardware</synopsis>
                <typeRef>uint32</typeRef>
            </component>
        </components>
    </LFBClassDef>
</LFBClassDefs>
</LFBLibrary>
```

As defined in componentID="1", the control block is only allowed to read the packetcount component but is not able to update the command component. As defined in componentID="2", the datapath(resource) can both read and update the packetcount component but only read the command component.

Step 4: Generating Code

Figure 7A:
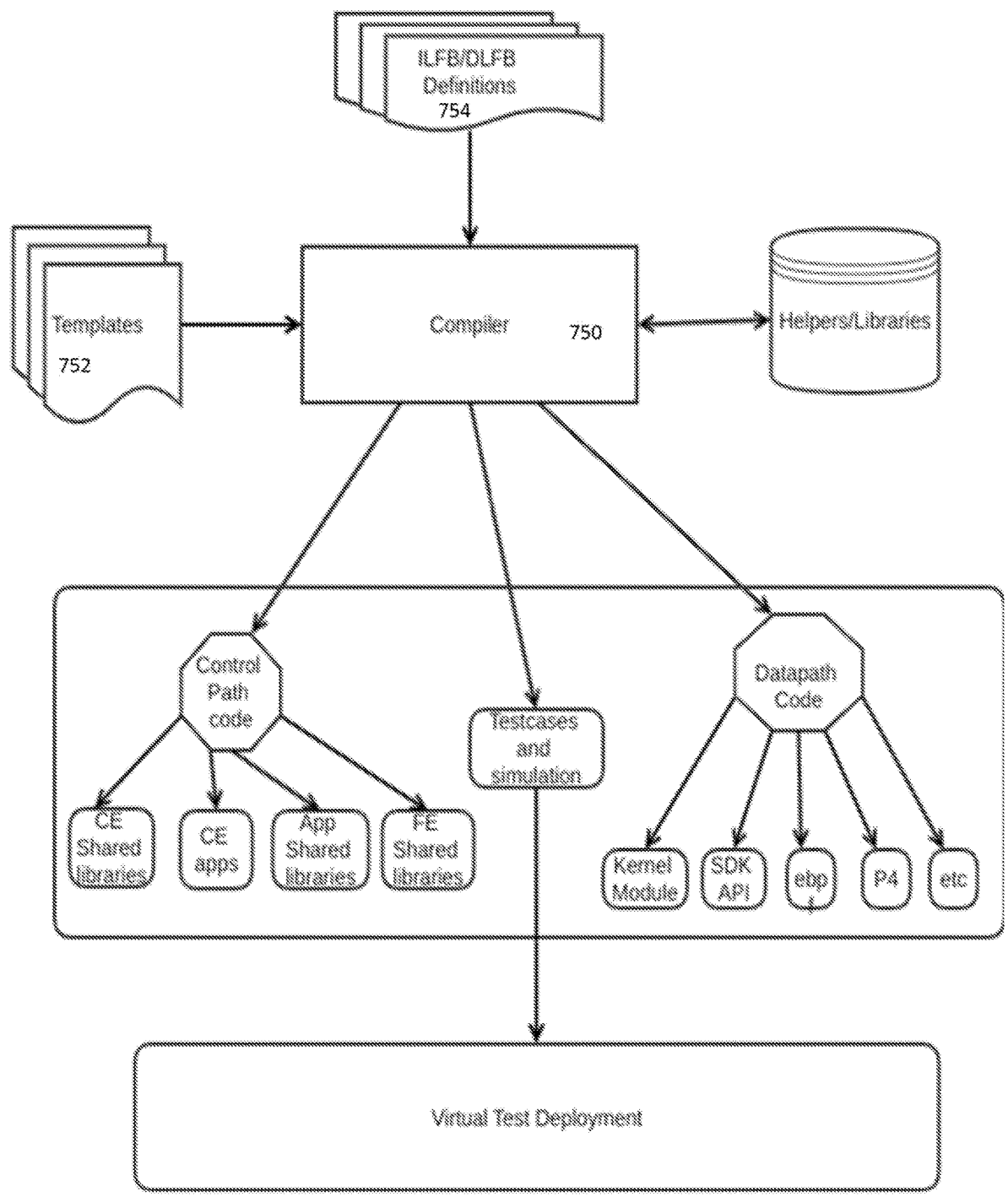
FIG. 7A is a block diagram illustrating a compiler block.

In step #4 above, the human operator generates code. A compiler is engaged in this step. In the example of FIG. 7A, the compiler block 750 of FIG. 7A is illustrated in greater detail. As discussed above, depending on the operator's choices, three blocks of code may be generated: Control Path code, Tescases and instrumentation, and Datapath code.

In the example of FIG. 7A, a compiler 750 may use templates 752 for describing different treatments. Templates 752 are used for transforming the design or NF definitions to the target codes. The compiler 750 first transforms the ILFB definition 754 into appropriate target code. The templates 752 may include:

Transform templates for generating the target code.
Optimization templates for optimizing the generated target codes.
Examples of Optimization templates include:
Get the generated code to take advantage of parallelization. For example when generating ebpf target code, the compiler 750 can be instructed by the NF designer to create per-cpu tables to avoid locking at the expense of more effort from the control plane that needs to access these tables; and
Target specific optimizations such as loop unrolling, etc.

In an example, in order to construct the example LFB of Listing3A above, a transform template of templates 752 may be used for describing a pseudo resource path code generation in a C-like language in Listing7A below. The template is aware of the definition notation of Listing3A. For example, the template is aware of the definitions component definition: that the component has a name (surrounded by <name></name> tags), access permission for both the data path(tagged with "resource-access") and control path (tagged with "control-access"). As an example the component named "packetcount" in Listing3A grants permissions of "read" for the control path trying to access it and "read update" when the datapath tries to access it; meaning the control path could only read the packetcount component but the datapath could both read and write to it. The template in Listing7A makes use of these access permission annotations to generate the necessary code.

Listing7A: Sample Template:

```
@to("/dev/stdout")
@defmac(accessors,ENDaccessors,name)
control_access_@$(name)(KIND kind, ...)
{
    switch (kind) {
    case ACCESS_READ:
    @if ((comp_ctl_access(comp_named(lfbclass,name)) & ACCESS_R) == false)
        return(ERR_ACCESS_NOT_PERMITTED);
    @else
        ...read @$(name)...
        return(SUCCESS);
    @endif
    case ACCESS_WRITE:
    @if ((comp_ctl_access(comp_named(lfbclass,name)) & ACCESS_U) == false)
        return(ERR_ACCESS_NOT_PERMITTED);
    @else
        ...update @$(name)...
        return(SUCCESS);
    @endif
}
resource_access_@$(name)(KIND kind, ...)
{
switch (kind) {
case ACCESS_READ:
@if ((comp_res_access(comp_named(lfbclass,name)) & ACCESS_R) == false)
    return(ERR_ACCESS_NOT_PERMITTED);
@else
    ...read @$(name)...
    return(SUCCESS);
@endif
case ACCESS_WRITE:
@if ((comp_res_access(comp_named(lfbclass,name)) & ACCESS_U) == false)
    return(ERR_ACCESS_NOT_PERMITTED);
@else
    ...update @$(name)...
    return(SUCCESS);
@endif
}
```

| Listing7A: Sample Template: |
| --- |

```
ENDaccessors
@call(accessors,"packetcount")
@call(accessors,"command")
```

As set out in the example of Listing 7A, the sample template comprises preprogrammed codes in a preset format. In this example, the transform template may be invoked for each ILFB component, the compiler 750 checks each component's control or resource(datapath) permissions and generates the appropriate code. For example, the component named "packetcount" in Listing3A will be subjected to the subroutine "control_access_@" to generate code for the control path access. The subroutine will have access to the component's name("packetcount") as well as its access-control permissions. It first checks if the named component control-access allows for "read" permission. If it does not, code is generated to deny access to the component (C-like code emitted is: "return(ERR ACCESS NOT PERMITTED);"). If it is permitted, then code is generated first to read the data value of "packetcount" and then indication of success is returned to the invoker. For the datapath access control "packetcount" will be subjected through the same exercise via the subroutine "resource_access_@"

As an example, the control access in Listing 8A below relates the code generating to the template and XML listing 3a.

For the LFB model in Listing3A, the template generates code illustrate in Listing8A below:

| Listing8A: Sample Datapath source code: |
| --- |

```
control_access_packetcount(KIND kind, ...)
{
    switch (kind) {
    case ACCESS_READ:
        ...read packetcount...
        return(SUCCESS);
    case ACCESS_WRITE:
        return(ERR_ACCESS_NOT_PERMITTED);
    }
}
resource_access_packetcount(KIND kind, ...)
{
    switch (kind) {
    case ACCESS_READ:
        ...read packetcount...
        return(SUCCESS);
    case ACCESS_WRITE:
        ...update packetcount...
        return(SUCCESS);
    }
}
control_access_command(KIND kind, ...)
{
    switch (kind) {
    case ACCESS_READ:
        return(ERR_ACCESS_NOT_PERMITTED);
    case ACCESS_WRITE:
        ...update command...
        return(SUCCESS);
    }
}
resource_access_command(KIND kind, ...)
{
    switch (kind) {
    case ACCESS_READ:
        ...read command...
        return(SUCCESS);
    case ACCESS_WRITE:
        return(ERR_ACCESS_NOT_PERMITTED);
    }
}
```

As an example, the component or key term "packetcount" which had defined control permissions of "read" in Listing3A results in generation of routine "control_access_packetcount" in Listing8A, as a result of the template in Listing7A which will allow reading of that component but deny writing to it by the control plane. Likewise, the component "command" which had defined control permissions of "update" in Listing3A results in generation of routine "control_access_command" in Listing8A as a result of the template in Listing7A which will allow writing to the component but reject the reading of the component. In the example of Listing8A, the key terms from the network function definition Listing 3A are provided to the template Listing7A to generate target codes in Listing8A.

At runtime, this code is invoked when either the control or data(resource) path needs to read or write to either the control or data(resource) paths. The functions with prefix resource_ are invoked when the datapath accesses the components and the functions with prefix control_ are invoked when the control path datapath accesses the components.

Library Code

Reference is made to FIG. 2A, which also shows generation of control path codes. The control path codes include:
- Application library, which may be loaded, at either a CE level or an FE level, by an SDN platform on demand when an application references a generated LFB;
- CE library, which may be loaded by a CE agent, on demand, to mediate on behalf of the LFB between the application on the northbound and FE on its southbound of a SDN platform;
- FE library, which may be loaded by an FE agent to mediate between the CE agent(s) and the resources targeted on behalf of the LFB; and
- Datapath code, which depends on the target. Illustrated in FIG. 4B are ebpf, P4 and standard kernel modules.

Step 6: Validating The NF

Reference is made to FIG. 2A, which also shows generation of instructions to run a test environment for validating the NF functionality. The instructions will describe the target simulation/test environment and architecture. For example, the target environment may be Arachne, described in the paper: "Arachne: Large Scale Data Center SDN Testing", Salim et al., Netdev 2.2. conference, Seoul, Korea, November 2017, as described in the on Intel x86 hardware. In an example, the 214 artifacts are compiled for execution target 215, such as Intel x86 and arachne configuration to install the appropriate control and datapath binaries in the right location.

NF Machine Interfacing

FIG. 3 illustrates a runtime service intent realization via a closed loop feedback control system 300. In FIG. 3, the system 300 is configured to observe and react to events, such as incoming packets, patterns, etc., in a network. The system 300 may include traditional policy updates at runtime, extending or replacing resources, and associated control applications and policies.

The machine interface 301 may be configured to actively create and inject NFs. Active NF creation and injection may be activated by:

runtime policy, which may be triggered by actionable events, such as programmed or defined by a human operator, which inject pre-existing NFs at appropriate locations in a network to extend existing and/or create new services;

runtime policy, which may be triggered by actionable events, including events programmed by a human operator, which facilitate code generation of new infrastructure NFs and/or services that may be injected at appropriate locations in a network; and runtime ML reaction to events which facilitate code generation of new NFs, services and control counterparts that then get injected at appropriate locations.

Services

Figure 12:
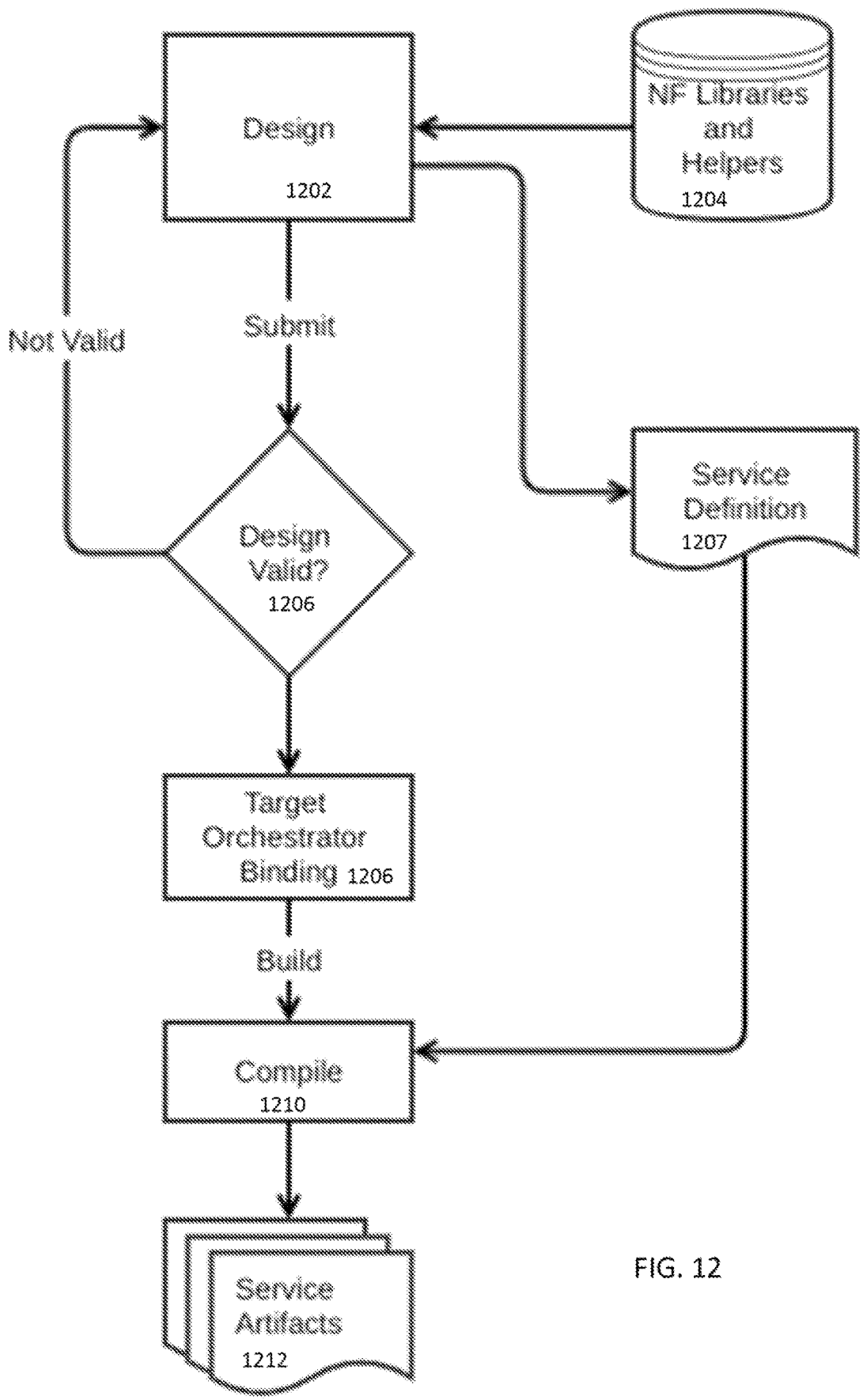
FIG. 12 is a block diagram illustrating a workflow for designing a service, according to another embodiment.

Reference is made to FIG. 2B described above and FIG. 12. As described above, FIG. 2B illustrates tooling infrastructure for creating Network services. FIG. 12 illustrates a workflow involved in creating and testing a new NF.

The human operator workflow is as follows:

1. At step 1202, the human operator designs the service, for example, via the graphical user interface(GUI). This includes selecting, for example, from NF libraries and helpers 1204, the NFs/ILFBs presented that are required for the service.
2. The human operator commits the design on the GUI by clicking "submit".
3. At step 1206, the GUI consults its backend to validate the design for any constraints:
   a. If there are any issues, an appropriate error message is presented to the operator and control is returned to the design stage; and
   b. If there is no issue, the GUI backend creates an SLFB definition 1207.
4. At step 1208, the human operator selects the target for the orchestrator, e.g., kubernetes, and then clicks on "Build". At step 1210, the GUI invokes its backend to use the SLFB definition 1207 from step #3 to compile the appropriate tooling for deployment. When this stage is done, artifacts that are ready to deploy for the target orchestrator are generated.
5. At step 1212, the human operator clicks on "test" or "deploy". At that point the artifacts built in step #4 are deployed to a target orchestrator environment using the GUI's backend. In case the user clicked on "test", tests generated in step #4 are executed for validation purposes. The user is presented with the results at the end of the test run.

Step 1: Human Interface for Service Creation

In an example, the human operator may create a upstream and downstream bandwidth management service in FIG. 10. In one embodiment, the GUI presents a buffet of NFs. The human operator may select, for example, by dragging and dropping NFs into a canvas, and then connect the NFs using dotted arrows 1121, 1122 and 1124 for connection between control block and datapath block, and arrows for connections between the programs and the NF policers and droppers of datapath block, such as 1113*a*, 1113*b*, 1103*a*, 1103*b*, 1165*a*, 1165*b*, 1167*a*, 1167*b*, 1162*a*, 1162*b*, 1168*a*, 1168*b*. as shown in FIG. 10. There are also arrows in the east-west direction for connections between the components of datapath block. The dotted arrows in the north to south and south to north direction show relationship between control block 1100*a* and datapath block 1100*b*. The solid arrows, such as 1113*a*, 1113*b*, 1103*a*, 1103*b*, 1165*a*, 1165*b*, 1167*a*, 1167*b*, 1162*a*, 1162*b*, 1168*a*, 1168*b*, in the east to west direction or west to east direction to show the datapath flow. The arrow may have one or two directions to indicate the relationship of relevant components of the datapath, or of relevant components between the control block 1100*a* and the datapath block 1100*b*, and of relevant components of the control. A service definition is therefore created by using the human interface with the selected NFs and the defined relationship between different NFs and the control block and datapath blocks. The human interface may be a GUI or other interface between the system 200 and the human operation.

In an example, the workflow for step #1 above may include:

Creating a canvas for the service by clicking on a "New" control button;

Creating a Control 1100*a* and datapath block 1100*b*;

On both the control block 1100*a* and datapath block 1100*b* create input 1112, 1114 and output ports 1120 and 1122, and input and out ports 1124, 1126 and 1128 at the control block, create identity transform helper program P3 1160, or P1 1158, P2 1164, P4 1166, P51162, or P6 1168, and define the expected input and output.

Selecting datapath LFBs and connecting them. An example workflow for the relationship between Policer ILFB instance "up_pol" 1102 connecting to the Dropper ILFB instance 1106:

Drag and drop ILFBs from a GUI selection that is presented onto the canvas and connect them. For example, in the case of the Policer ILFB instance "up_pol" 1102 connecting to the Dropper ILFB instance "drop_egress" 1106, the process will be as follows:

1. Drag and drop a Policer ILFB and name it "up_pol" (1102).
2. Drag and drop a Dropper ILFB and name it "Drop_egress" (1106).
3. Drag and drop an identity transform helper program and name it "P3" 1160, or P1 1158, P2 1164, P4 1166, P51162, or P6 1168.
4. Click on the "exceeded" port of Policer ILFB instance "up_pol" (1102*b*) to highlight it and pull an arrow from it to P3 program 1160; highlight P3 and pull an arrow from it to the "drop_in" port 1106*a* in Dropper ILFB "Drop_egress" instance. At this point the two ILFB instances are connected.

Define the Service control block

Describe which selected datapath LFBs components are derived for the service components; what the Capabilities and events for the service are and finally their associated access permissions; For example, on block 1100*a*:

Create a component which is a table type with 7 elements in its row:

serviceid—which is a service identifier.

up_index, up_rate and up_burst which are derived from the datapath block's "up_poll" Policer ILFB instance index, rate and burst;

down_index, down_rate and down_burst which are derived from the datapath block's "down_poll" Policer ILFB instance components index, rate and burst.

Drag and drop a transform program 1120 into the control block
  Connect the transform program to the associated ports ctrlDown, ctrlUp and ctrlIntf ports with arrows
  Describe the relationship between the control ports ctrlDown, ctrlUp and ctrlIntf to the transform program by connecting with arrows the different ports and the transform program. For example, port CtrlIntf to the transform program relationship: the service will receive data of the form {serviceid, up_rate, up_burst, down_rate, down_burst} from a service application via the port CtrlIntf which the transformation program will break it down into:

{up_index, uprate, up_burst} that is sent via port ctrlUp to datapath "up_poll" Policer ILFB instance port up_ctrl.

{down_index, down_rate, down_burst} that is sent via port ctrlDown to datapath "down_poll" Policer ILFB instance port down ctrl 1104*d*.

During the validation phase, the GUI backend may check for constraints, for example, whether the human operator is attempting to connect non-compatible LFBs(based on their respective LFB input/output port definitions) in the same graph, etc.

When the GUI backend determines that the service design is acceptable, the GUI creates a service definition. Listing2 below shows an example manifestation of a service definition for the "BW1" Service of FIG. 10:

---

Listing2: Sample Service

---

```
Service:
      Id: 1234
      Name: "BW1"
      TopologyTable:
            -1: {BW1, BW1_1, from_ingress}-->{Policer, up_pol, pol_in}
            -2: {Policer, up_pol, Conform}-->{BW1, BW1_1, to_egress}
            -3: {Policer, up_pol, Exceeded}-->{Dropper, drop_egress, drop_in}
            -4: {BW1, BW1_1, from_egress}-->{Policer, down_pol, pol_in}
            -5: {Policer, down_pol, Conform}-->{BW1, BW1_1, to_ingress}
            -6: {Policer, down_pol, Exceeded}-->{Dropper, drop_ingress, drop_in}
      ServiceComps:
            - comp:
                     Name: "serviceid"
                     To: "/types/u32"
                     Transform:
                     - Type: "Identity"
            - comp:
                     Name: "up_rate"
                     To: "/Policer/up_pol/actions/rate"
                     Transform:
                     - Type: "Identity"
            - comp:
                     Name: "up_burst"
                     To: "/Policer/up_pol/actions/burst"
                     Transform:
                     - Type: "Identity"
            - comp:
                     Name: "up_index"
                     To: "/Policer/up_pol/actions/index"
                     Transform:
                     - Type: "Identity"
            - comp:
                     Name: "down_rate"
                     To: "/Policer/down_pol/actions/rate"
                     Transform:
                     - Type: "Identity"
            - comp:
                     Name: "down_burst"
                     To: "/Policer/down_pol/actions/burst"
                     Transform:
                     - Type: "Identity"
            - comp:
                     Name: "down_index"
                     To: "/Policer/down_pol/actions/index"
                     Transform:
                     - Type: "Identity"
      LFBInputs:
      - LFBInput: "from_ingress"
            Id: 1
            Type: Resource
            AllowedData:
            - Type: "meta"
                  Name: "serviceid"
                  id: 11
                  Type: u32
```

```
Listing2: Sample Service

- Type: "meta"
            Name: "pktlen"
            id: 12
            Type: u32
        - Type: "data"
            Name: "pktdata"
            id: 13
   - LFBInput: "from_egress"
        Id: 2
        Type: Resource
        AllowedData:
        - Type: "meta"
            Name: "serviceid"
            id: 21
            Type: u32
        - Type: "meta"
            Name: "pktlen"
            id: 22
            Type: u32
        - Type: "data"
            Name: "pktdata"
            id: 23
            Type: byte[ ]
LFBProgs:
-Prog:
    Type: "Identity"
    Id: 1
    Name: "P1"
    Hook: "LFBInputs/LFBInput/from_ingress"
-Prog:
    Type: "Identity"
    Id: 3
    Name: "P3"
    Hook: "LFBInputs/LFBInput/from_egress"
```

Listing2: Sample Service

In Listing2 above, the "TopologyTable" stanza describes different ILFBs to form a service graph. The syntax is:

Source {LFB Class,LFB class instance name, egress port}->Destination {LFB Class,LFB class instance name, ingress port}

In the example of Listing2, the "ServiceComps" stanza is used to define the service components that are specific to the service "BW1". In addition, the stanza is used to describe transforming the service components to the ILFB specific components. In the case of the "BW1" service, an identify transform is used: for example, the "up_rate" value will be mapped, unchanged, to the relevant upstream Policer ILFB instance's "rate" component.

In the example of Listing2, the "LFBInputs" stanza illustrates two of the BW1 input ports, namely "from_ingress" 1112 and "from_egress" 1114, as well as the data and metadata acceptable to "from_ingress" 1112 and "from_egress" 1114.

In the example of Listing2, the "LFBProgs" stanza illustrates two of BW1 programs "P1" 1158 and "P3" 1160. The description defines the kind of programs of "P1" 1158 and "P3" 1160 and the ports from which "P1" 1158 and "P3" 1160 accept input.

Step 4: Generating Artifacts

In Step #3, the human operator selects a target orchestration system. The orchestration system sets up the infrastructure; examples are openstack and kubernetes. In step #4 above, the human operator in FIG. 13 generates the artifacts for the targeted orchestration system. A compiler is engaged in this exercise.

In an example, a compiler may use "templates" for describing the different treatments. Different treatments may generate different templates.

Service Machine Interfacing

Similar to NF Machine Interfacing, the service machine interface may create and update services. Active service creation and updating may be activated by:

1. runtime policy, triggered by actionable events, as programmed or defined by a human operator, which allow injection of new NFs in a service graph at existing services;
2. runtime policy, triggered by actionable events, as programmed by a human operator, which facilitate code generation of new infrastructure NFs to create new services that then get deployed at appropriate locations; and
3. runtime ML reaction to events which facilitate code generation of new NFs, services and control counterparts that then get injected at appropriate locations.

The codes generated in items 2 and 3 would have to otherwise be written by a developer.

Service Deployment

The service deployment compensates for placement shortcomings of the different orchestration schemes. In some examples, two deployment modes may be used:

1. Getting data to the NF. In other words, the design intent separates the handling of where NF execution takes place and how the data is delivered to the NFs to achieve a service.
2. Getting the NF closer to the data. This includes creating and placing NFs in locations closer to the sources as well as moving parts of the control applications closer to the NFs, as opposed to a centralized deployment mode.

The second deployment mode getting the NF closer to the data is useful for edge computing. The orchestration system scheduling may be determined based on the above two modes. In addition, additional scheduling hooks may be added to compensate on the orchestration system used. For example, most of the orchestration systems, such as kubernetes, derive their scheduling decisions based on compute resource utilization, whereas in packet processing systems, other inputs, such as link utilization and table size constraints, etc., play a role.

Figure 13:
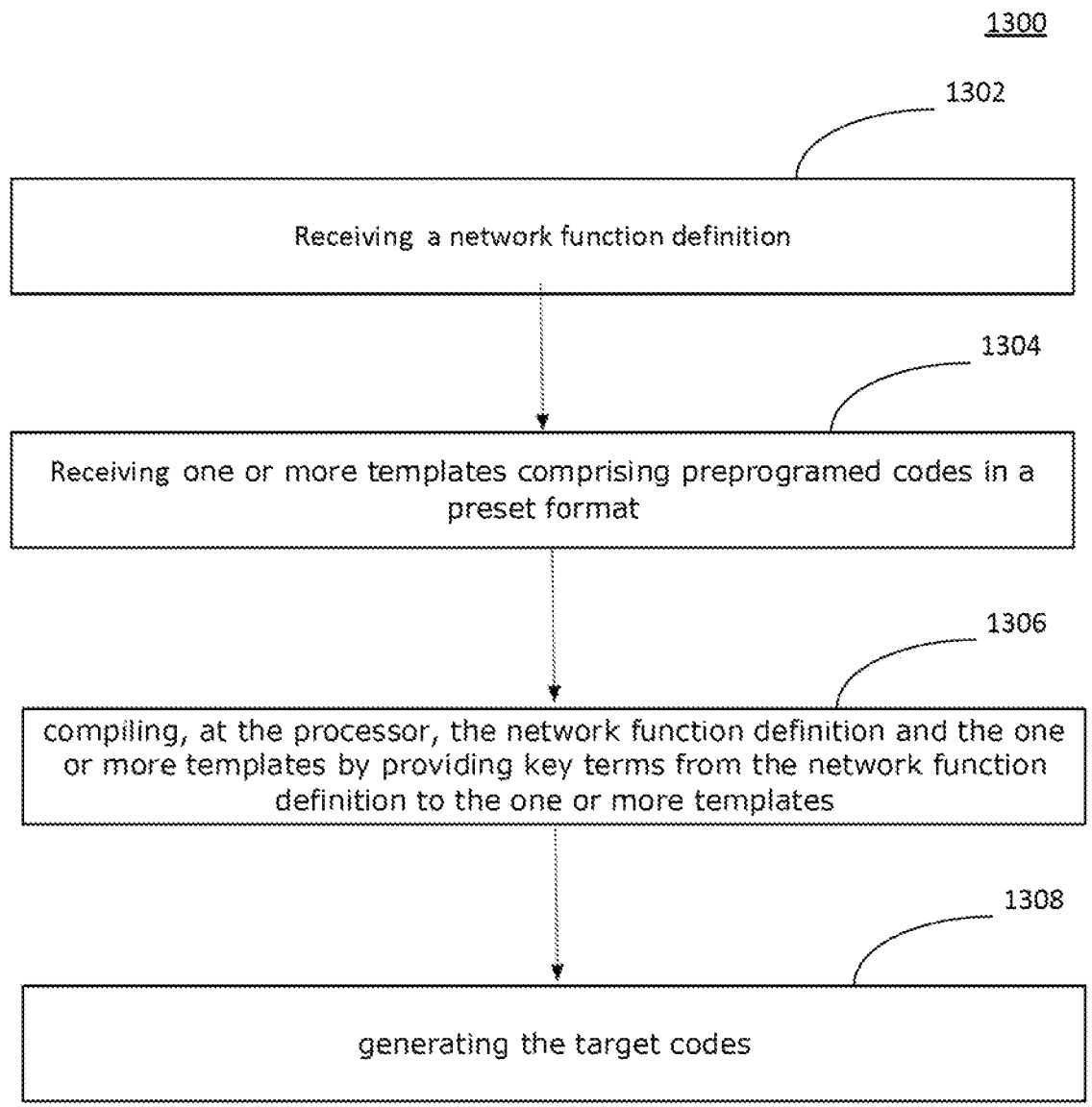
FIG. 13 is a flow chart illustrating a process of generating target codes.

FIG. 13 illustrates a process 1300 for generating target codes for network functions. In the example of FIG. 13, a method 1300 for generating target codes for one or more network functions for execution in a network, including: at step 1302, receiving, at a processor or the complier 212 or 750, a network function definition 210, 220 or 754; at step 1304, receiving, at the processor or the complier 212 or 750, one or more templates 240 or 752 comprising preprogrammed codes in a preset format; at step 1306 compiling, at the processor or the complier 212 or 750, the network function definition 210, 220 or 754 and the one or more templates 240 or 752 by providing key terms from the network function definition 210, 220 or 754 to the one or more templates 240 or 752; and at step 1308, generating the target codes.

The key terms from the network function definition 210, 220 or 754 may include parameters or specifications defined in the network function definition 210, 220 or 754, such as parameter related to packetcount. in the example of Listing8A. For example, the target codes in Listing8A may be generated when the template in Listing7A is filled with the key terms or parameters defined network function definition in the Listing 3A.

In an embodiment, the network function comprises a LFB data model.

In an embodiment, the LFB data model comprising a control block definition and a definition for one or more datapath blocks and a definition of relationship between the control block definition and the definition for one or more datapath blocks, and the relationship between one or more datapath blocks.

In an embodiment, the network function definition is received from a human machine interface.

In an embodiment, the human machine interface is graphical user interface.

In an embodiment, the network function definition is created by selecting network functions in the graphical user interface.

In an embodiment, the selected network functions comprises one or more Control Blocks, one or more Datapath blocks, one or more input or output ports respectively associated with the one or more control blocks and the one or more datapath blocks.

In an embodiment, the network function definition comprises a definition of transforms applied to data or metadata passing through one or more ports of the one or more control blocks.

In an embodiment, the target codes comprise at least one of control path codes and datapath codes.

In an embodiment, the control path codes comprises at least one of an application library, a CE library, an FE library.

In an embodiment, the datapath codes comprising codes for processing packets.

In an embodiment, the datapath codes comprises kernel module, SDK API, p4, eBPF, PFGA.

In an embodiment, the LFB data model comprises one or more of ILFBs, DLFBs, or SLFBs.

In an embodiment, the one or more templates comprise at least one optimization template for optimizing the generated target codes.

In an embodiment, the network function definition comprises create, read, update, delete (CRUD) permission definition for one or more Control Blocks or one or more Datapath blocks access to shared data.

In an embodiment, the network function definition comprises input ports and output ports for one or more Control Block or one or more Datapath blocks, wherein the input ports comprising parsers and the output ports comprising deparsers.

In an embodiment, the network function definition comprises a definition of LFBs derived from other LFBs.

In an embodiment, the network function definition comprises a transform program.

In an embodiment, the LFB definition comprises defining a service datapath and associated connectivity by connecting the one or more ILFBs via input and output ports of the service datapath.

In an embodiment, the LFB definition comprises a network service definition.

In an embodiment, a system for generating target codes for one or more network functions for execution in a network, comprises: one or more network definitions modules; one or more preprogrammed templates modules; and a processor configured to: receive a network function definition from the one or more network function definitions modules; receive, at the processor, one or more templates selected from the one or more preprogrammed templates modules, wherein the one or more templates comprises preprogrammed codes in a preset format; compile, at the processor, the network definition and the one or more templates by providing key terms from the network definition to the one or more templates; and generate the target codes.

In an embodiment, the system further comprises a machine interface in communication with the processor for creating the LFB definition.

Certain adaptations and modifications of the described embodiments can be made. Therefore, the above discussed embodiments are considered to be illustrative and not restrictive.

What is claimed is:

1. A method for generating target codes for one or more network functions for execution in a network, comprising:
   receiving, at a processor, a network function definition that is a standalone module encapsulating a resource path and one or more control blocks;
   receiving, at the processor, one or more templates for transforming the network function definition to the target codes, the one or more templates comprising preprogrammed codes in a preset format;
   compiling, at the processor, the network function definition and the one or more templates by providing key terms from the network function definition, wherein the key terms include parameters or specification from the network function definition, to the one or more templates; and
   generating, at the processor, the target codes based on the preprogrammed codes and the key terms provided from the network function definition.

2. The method of claim 1, wherein the network function comprises a Logical Functional Block (LFB) data model.

3. The method of claim 2, wherein the LFB data model comprises one or more of Infrastructure Logical Functional Block (ILFBs), Derived Logical Functional Block (DLFBs), or Service Logical Functional Block (SLFBs).

4. The method of claim 3, wherein a definition in the LFB data model comprises defining a service datapath and associated connectivity by connecting the one or more ILFBs via input and output ports of the service datapath.

5. The method of claim 3, wherein a definition in the LFB data model comprises a network service definition.

6. The method of claim 2, wherein the LFB data model comprises a control block definition and a definition for one or more datapath blocks and a definition of relationship between the control block definition and the definition for one or more datapath blocks, and the definition of relationship between one or more datapath blocks.

7. The method of claim 1, wherein the network function definition is received from a human machine interface.

8. The method of claim 7, wherein the human machine interface is graphical user interface.

9. The method of claim 8, wherein the network function definition is created by selecting network functions in the graphical user interface.

10. The method of claim 9, wherein the selected network functions comprise one or more Control Blocks, one or more Datapath blocks, one or more input or output ports respectively associated with the one or more Control Blocks and the one or more Datapath blocks.

11. The method of claim 10, wherein the network function definition comprises a definition of transforms applied to data or metadata passing through one or more ports of the one or more control blocks.

12. The method of claim 10, wherein the network function definition comprises create, read, update, delete (CRUD) permission definition for the one or more Control Blocks or the one or more Datapath blocks access to shared data.

13. The method of claim 10, wherein the network function definition comprises input ports and output ports for the one or more control block or one or more datapath blocks, wherein the input ports comprises parsers and the output ports comprising deparsers.

14. The method of claim 1, wherein the target codes comprise at least one of control path codes and datapath codes.

15. The method of claim 14, wherein the control path codes comprise at least one of an application library, a Control Element (CE) library, an Forward Element (FE) library.

16. The method of claim 14, wherein the datapath codes comprise codes for processing packets.

17. The method of claim 14, wherein the datapath codes comprise kernel module, Software Development Kit (SDK) Application Programming Interface (API), p4, Extended Berkeley Packet Filter (eBPF), Field-programmable Gate Array (PFGA).

18. The method of claim 1, wherein the one or more templates comprise at least one optimization template for optimizing the generated target codes.

19. The method of claim 1, wherein the network function definition comprises a definition of Logical Functional Blocks (LFBs) derived from other LFBs.

20. The method of claim 1, where the network function definition comprises a transform program.

21. A system for generating target codes for one or more network functions for execution in a network, comprising:
one or more network function definitions modules;
one or more preprogrammed templates modules; and
a processor configured to:
receive a network function definition that encapsulate a resource path and one or more control blocks from the one or more network function definitions modules;
receive, at the processor, one or more templates selected from the one or more preprogrammed templates modules, wherein the one or more templates transform the network function definition to the target codes, the one or more templates comprises preprogrammed codes in a preset format;
compile, at the processor, the network function definition and the one or more templates by providing key terms from the network function definition to the one or more templates; and
generate the target based on the preprogrammed codes and the key terms provided from the network function definition.

22. The system of claim 21, further comprising a machine interface in communication with the processor for creating a Logical Functional Block (LFB) definition.

* * * * *